United States Patent [19]

De Boynton et al.

[11] Patent Number: 4,580,348

[45] Date of Patent: Apr. 8, 1986

[54] METHOD OF GAGING A PIPE AT MULTIPLE LOCATIONS

[75] Inventors: William L. De Boynton, Arcadia; Frederick C. Lee, South Pasadena; Bruce E. Wilson, Chino; John F. O'Rourke, Hacienda Height, all of Calif.

[73] Assignee: Hydril Company, Los Angeles, Calif.

[21] Appl. No.: 588,325

[22] Filed: Mar. 12, 1984

Related U.S. Application Data

[62] Division of Ser. No. 391,475, Jun. 23, 1982.

[51] Int. Cl.⁴ .............................................. G01B 5/16
[52] U.S. Cl. .................................................. 33/199 R
[58] Field of Search ........................... 33/199 R, 199 B

[56] References Cited

U.S. PATENT DOCUMENTS

| | | |
|---|---|---|
| 1,614,448 | 1/1927 | Mensforth et al. . |
| 1,879,398 | 9/1932 | Mirfield . |
| 2,331,757 | 10/1943 | Anders . |
| 2,547,774 | 4/1951 | Prais . |
| 2,974,418 | 3/1961 | Stimson .............................. 33/199 B |
| 3,047,960 | 8/1962 | Mittenbergs et al. . |
| 3,090,126 | 5/1963 | Kernoski . |
| 3,091,867 | 6/1963 | Ryan, Jr. ............................ 33/199 R |
| 3,237,312 | 3/1966 | Boppel ............................... 33/199 B |
| 3,432,935 | 3/1969 | Reish . |
| 3,537,184 | 11/1970 | Hearn . |
| 3,590,492 | 7/1971 | Johnson . |
| 3,812,591 | 5/1974 | Michaud . |
| 3,872,602 | 3/1975 | Kennedy et al. . |
| 3,989,284 | 11/1976 | Blose . |
| 4,184,265 | 1/1980 | Horton . |
| 4,324,049 | 4/1982 | Blose . |

FOREIGN PATENT DOCUMENTS

| | | |
|---|---|---|
| 39036 | 7/1886 | Fed. Rep. of Germany . |
| 483605 | 10/1929 | Fed. Rep. of Germany . |
| 1070833 | 12/1959 | Fed. Rep. of Germany .... 33/199 R |
| 2200432 | 10/1972 | Fed. Rep. of Germany . |
| 241025 | 4/1969 | U.S.S.R. . |

*Primary Examiner*—William D. Martin, Jr.
*Attorney, Agent, or Firm*—William W. Haefliger

[57] ABSTRACT

A workpiece gaging system includes carriage structure for a gaging part, movable longitudinally and laterally, and a rotor to rotate that structure; also indicator means is operatively connected with the part to indicate the status of engagement, displacement, or need for displacement, of the gaging part relative to a surface or surfaces (such as pipe threads) to be gaged, as at multiple locations. Measurement encoding and signal processing means are also provided.

7 Claims, 29 Drawing Figures

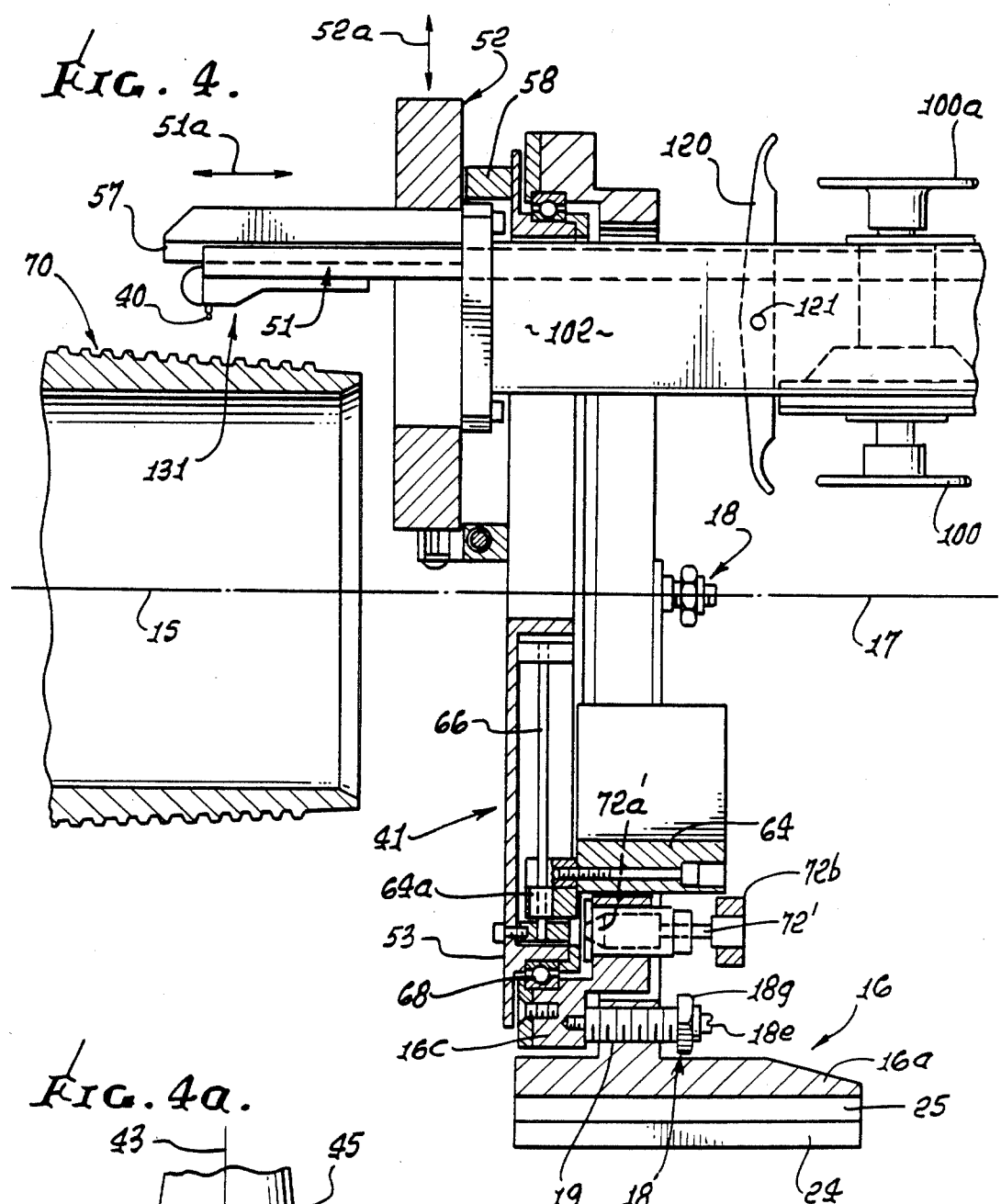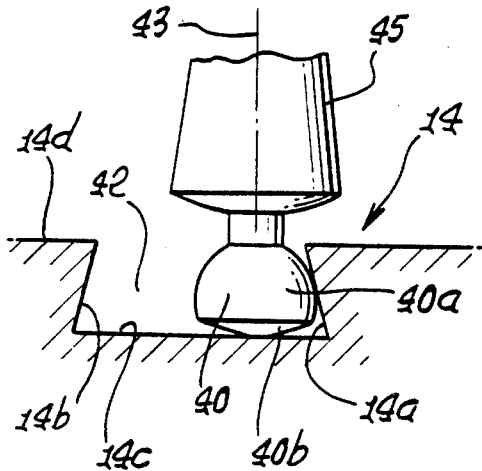

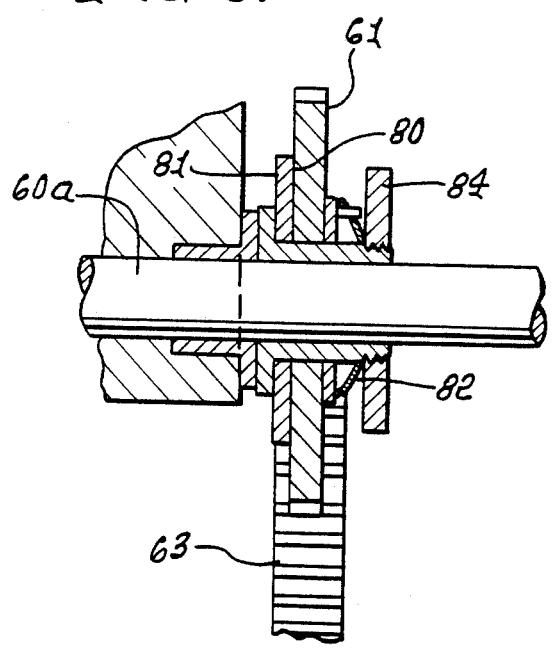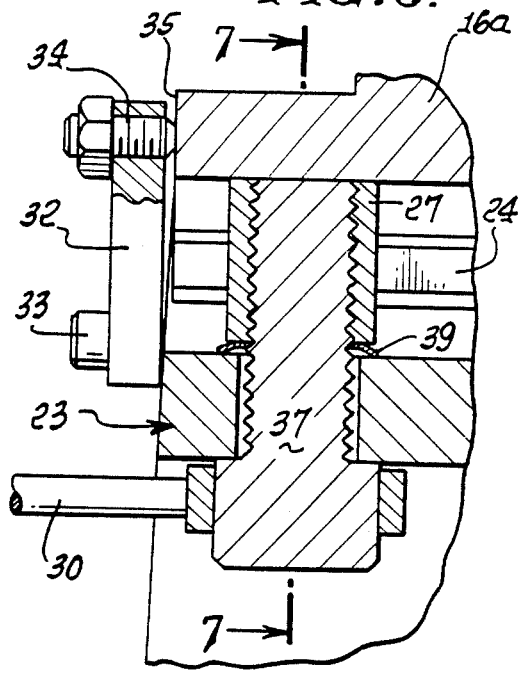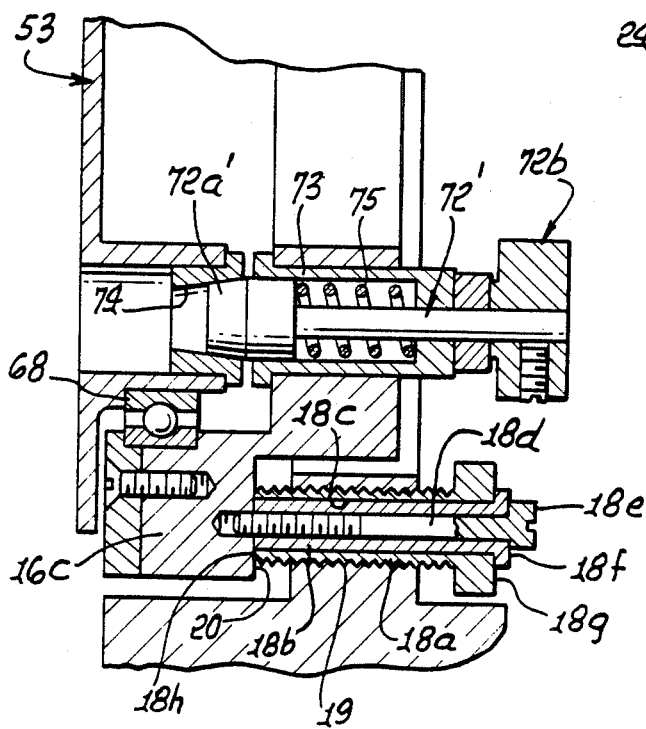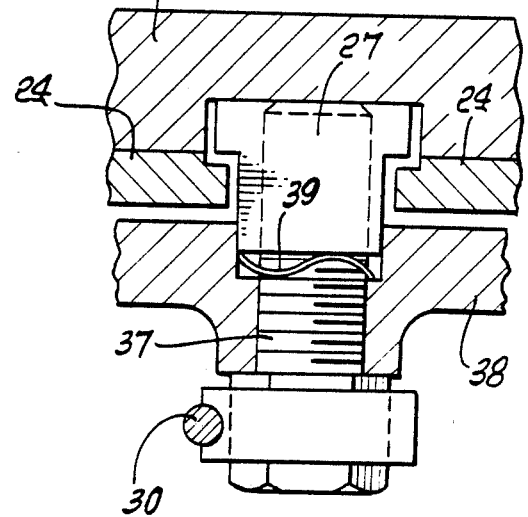

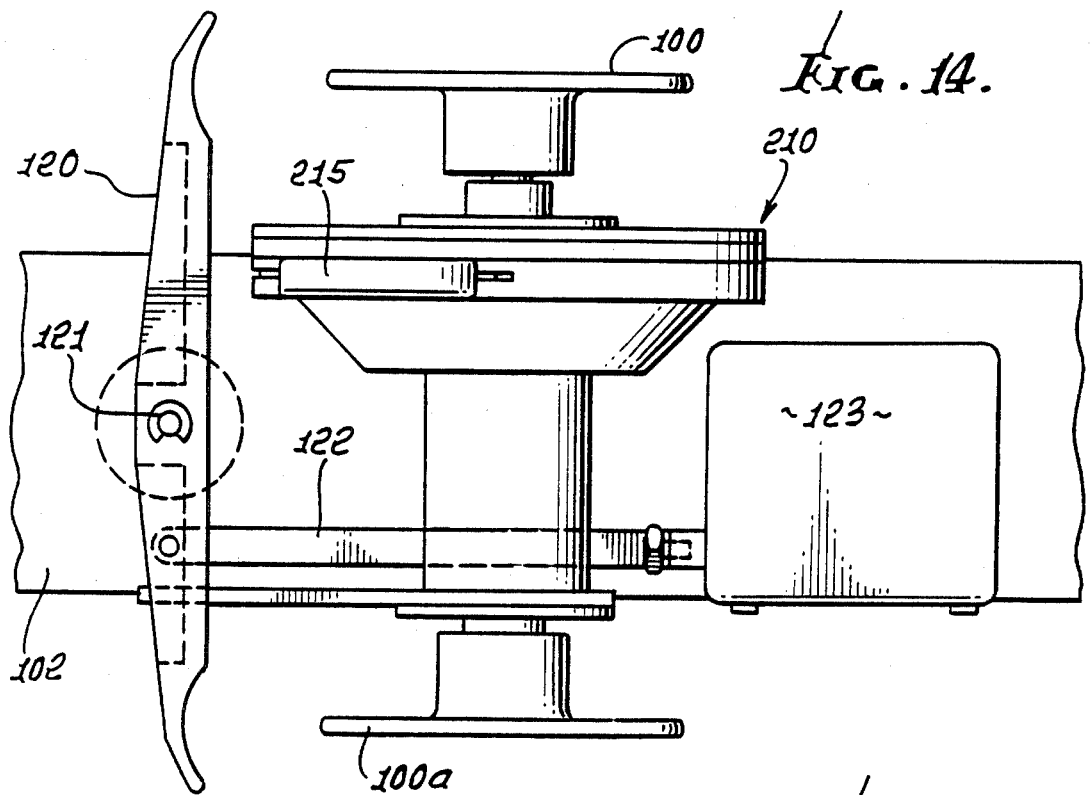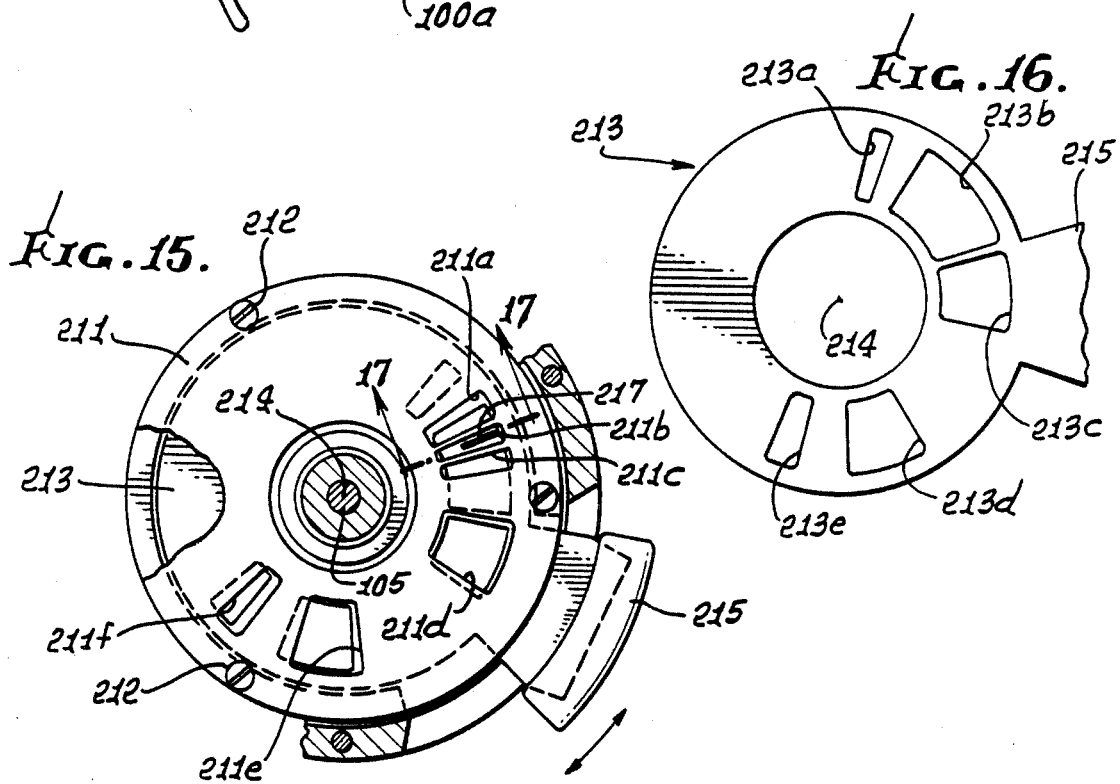

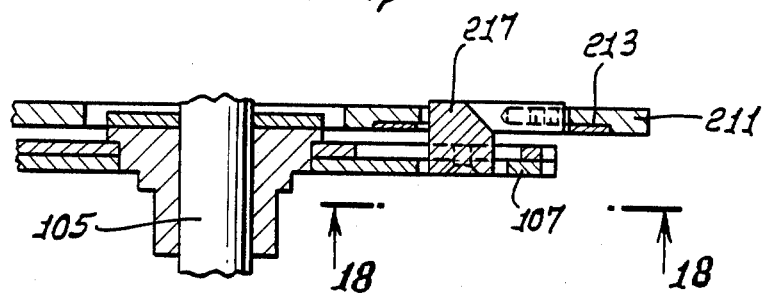
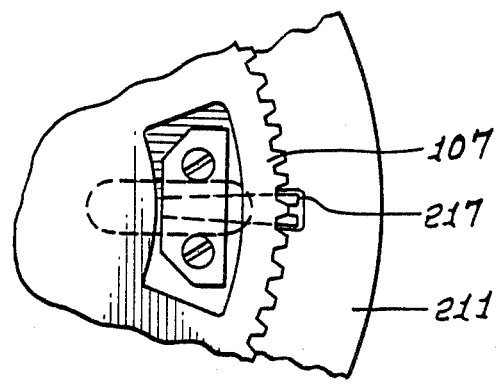
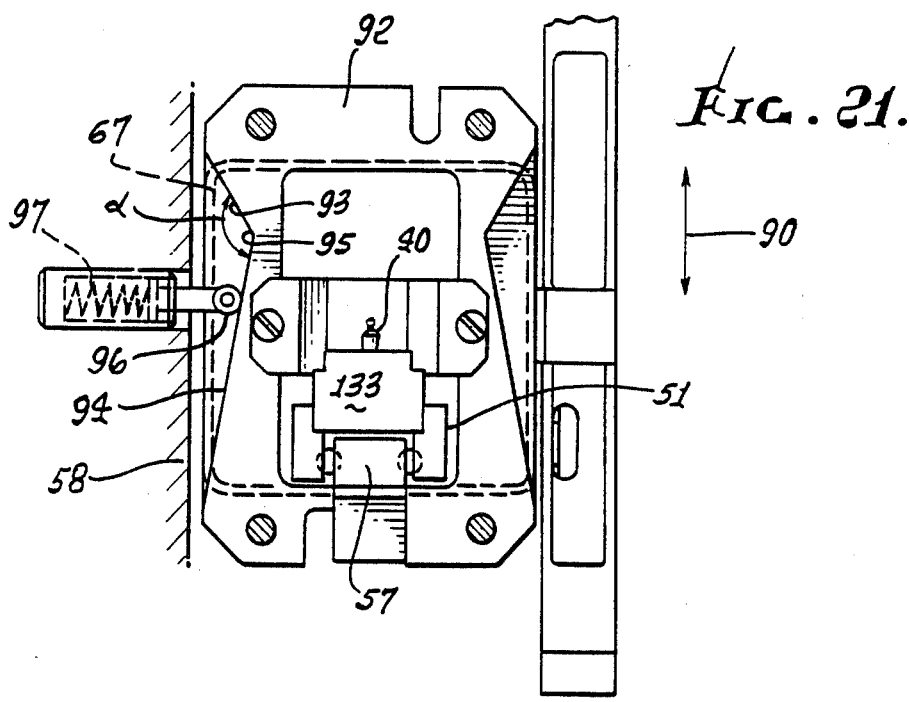

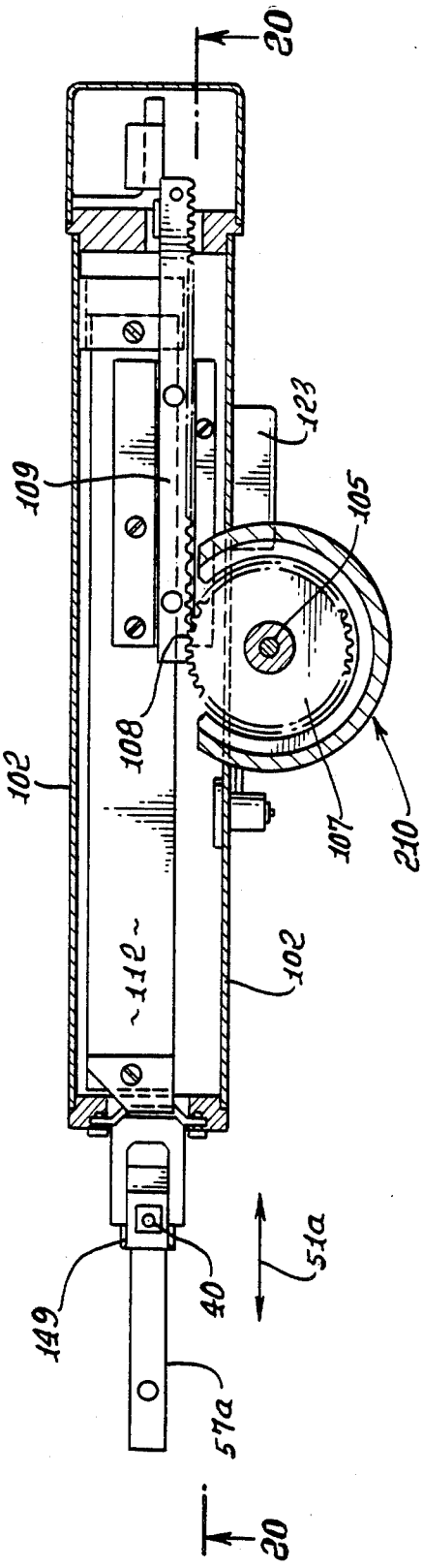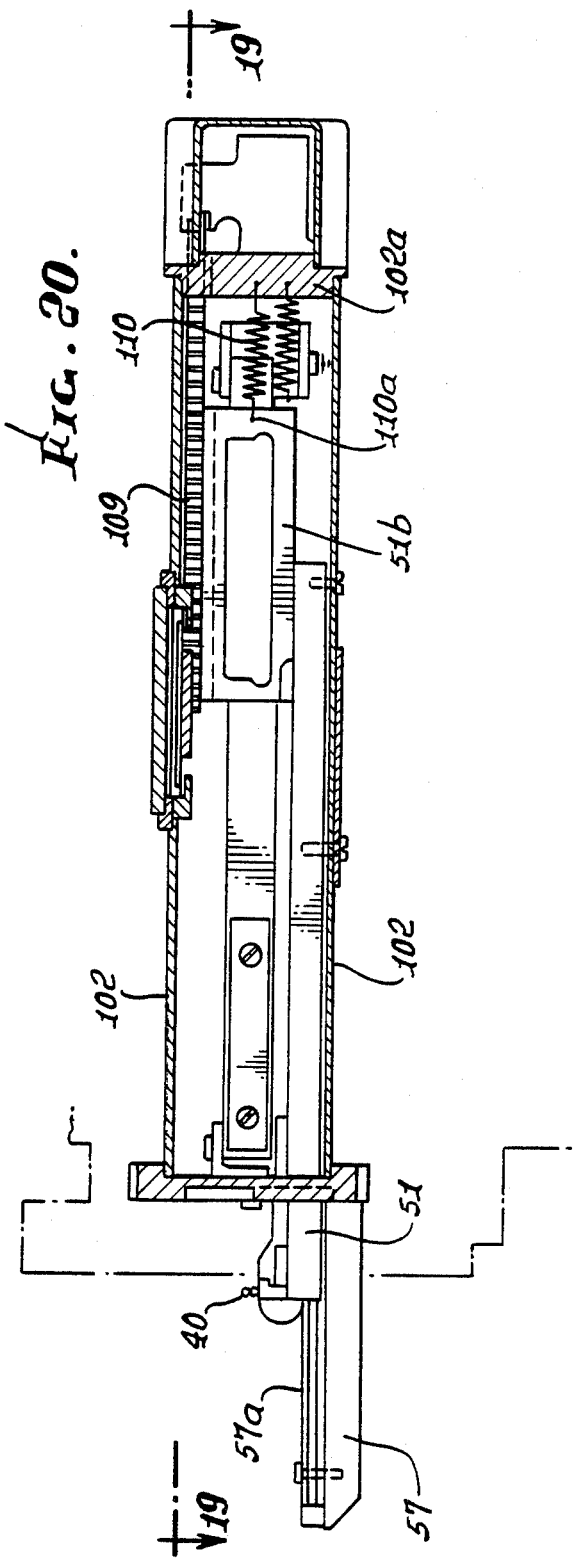

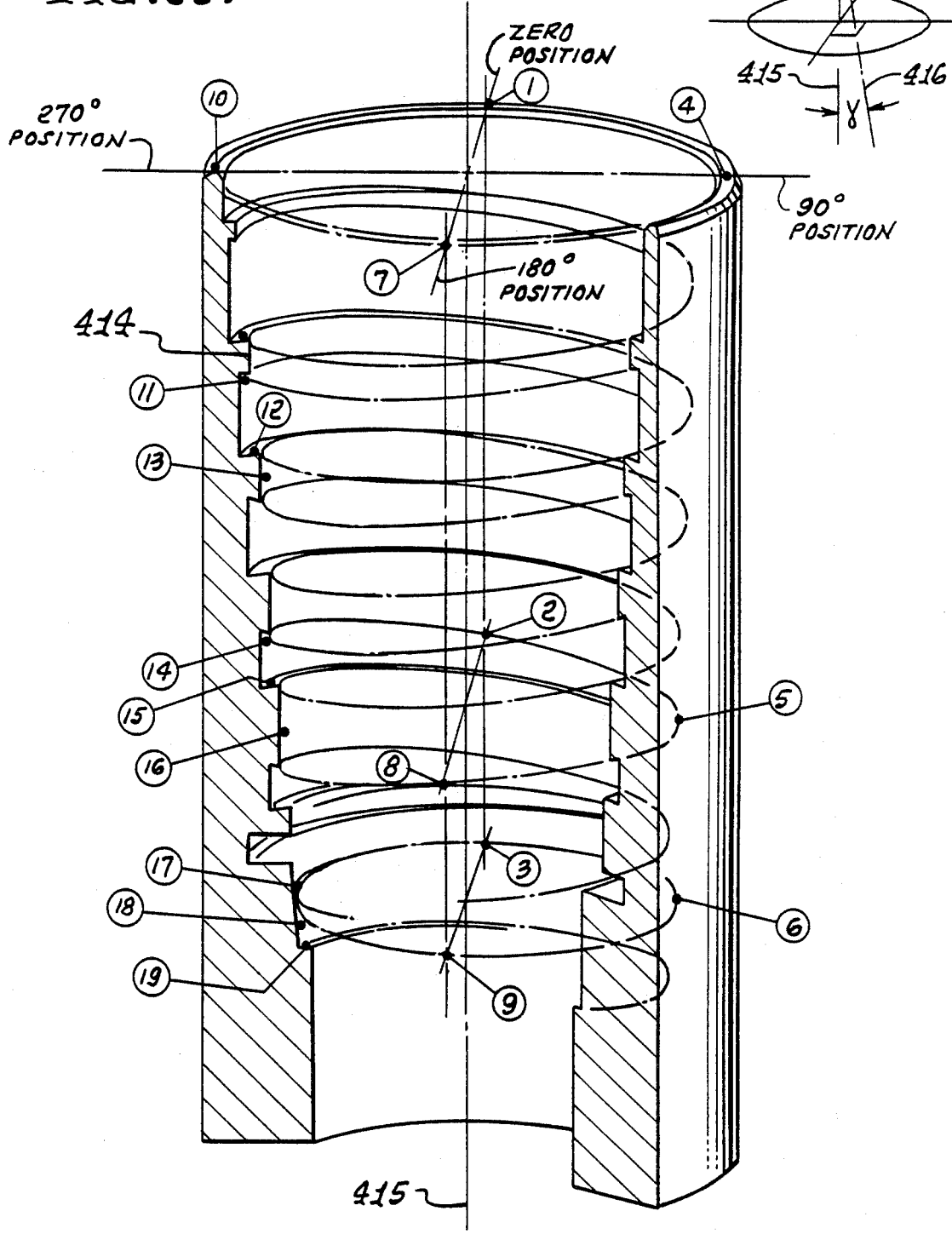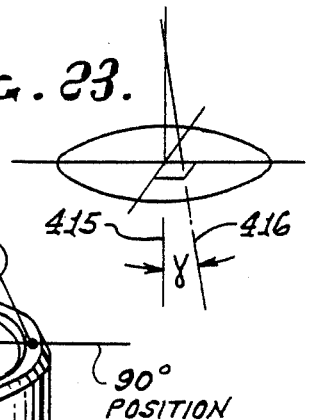

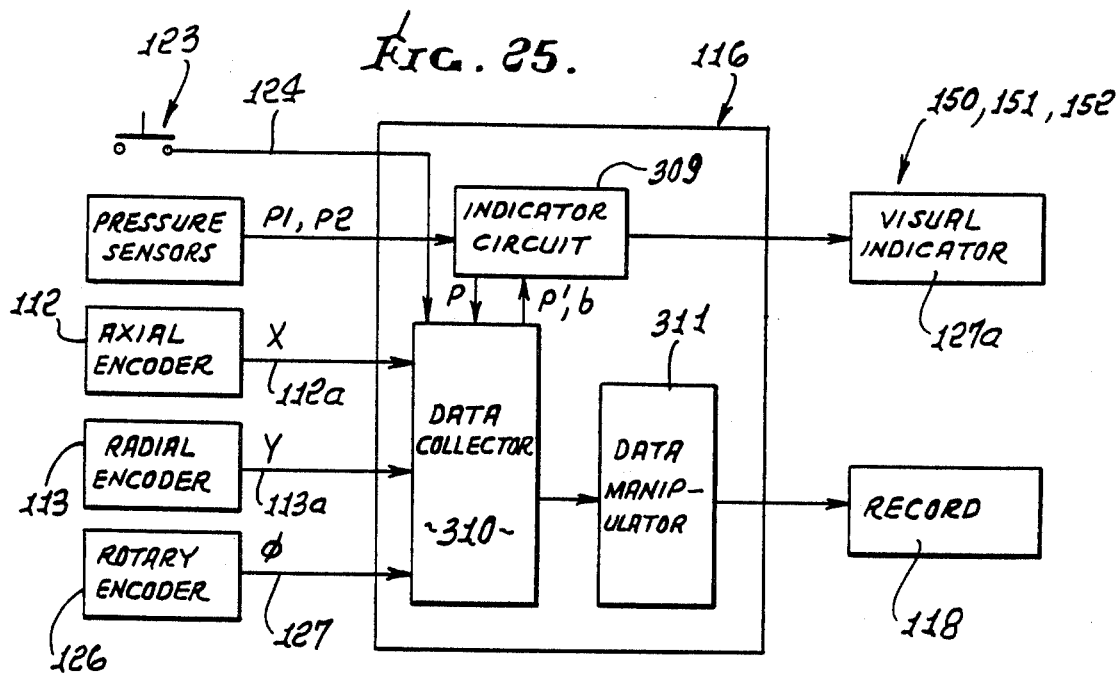
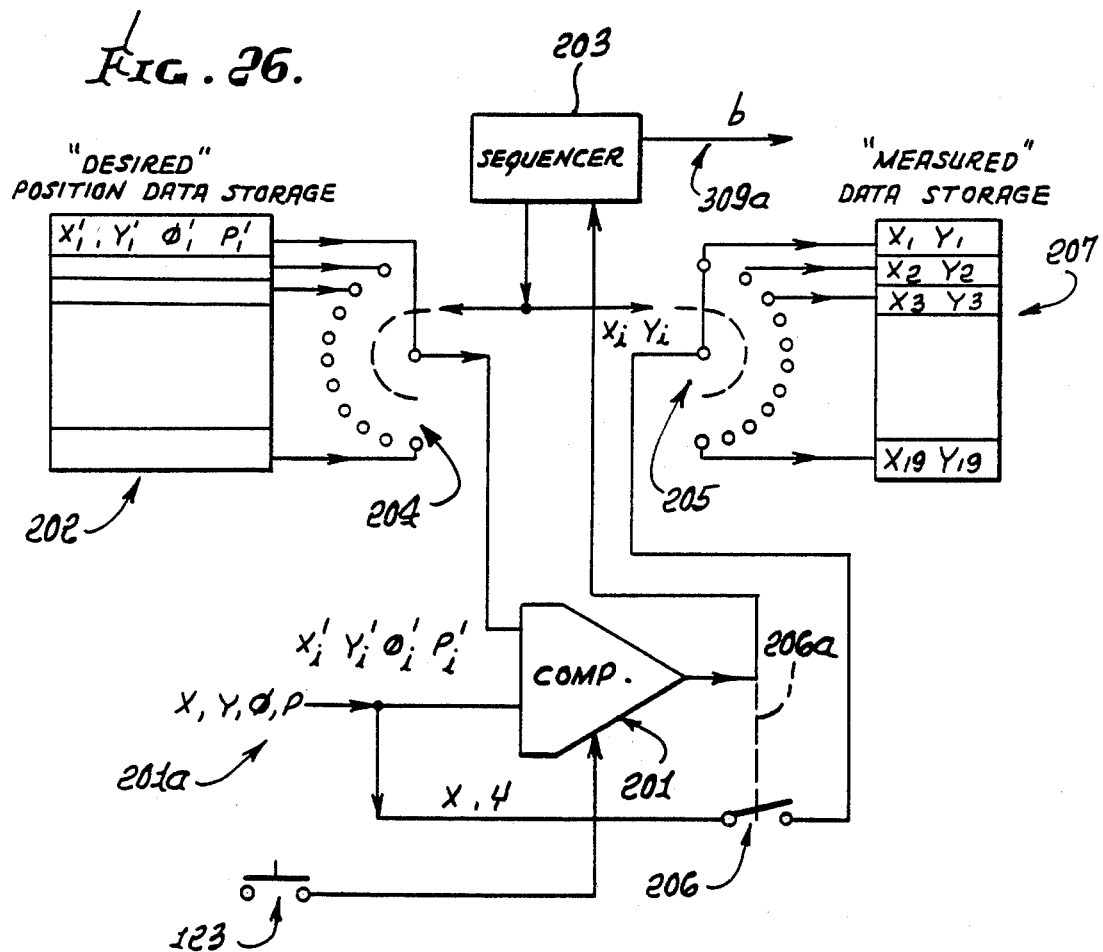

METHOD OF GAGING A PIPE AT MULTIPLE LOCATIONS

This is a division of application Ser. No. 391,475 filed June 23, 1982.

BACKGROUND OF THE INVENTION

This invention relates generally to instrumentation for gaging workpieces and the threads of workpieces; more particularly, it concerns apparatus and method to accomplish rapid and accurate gaging of pipe threads, including thread flanks.

It is important in the cutting of threads on workpieces such as pipes to maintain dimensional accuracy of thread flank angularity and axial positioning along the thread length. Maintenance of such accuracy is important to ensure ease of make-up with a corresponding pin or box member, to reduce or eliminate any tendency for connection material to inappropriately interfere and gall, and to ensure complete joint integrity. This is of special importance to tubing and casing connection designs used in deep, high pressure, oil and gas well applications. The maintenance of thread flank dimensional accuracy is especially important in respect of a recently developed, highly advantageous thread known as the Blose thread, and described in U.S. Pat. No. Re. 30,647.

Accordingly, it becomes important to be able to accurately and rapidly monitor or gage thread flanks as well as thread crests and root dimensions. While thread gages are known, none to our knowledge possess the unusually advantageous structural and functional advantages of the apparatus and method described herein.

SUMMARY OF THE INVENTION

It is a major object of the invention to provide gaging apparatus and techniques which meet the need described above.

Basically, the apparatus comprises:

(a) a gaging part engageable with the work surfaces, (b) carriage structure for said part, said structure including a first section movable longitudinally, a second section movable laterally, and a rotor for rotating said sections and said part about an axis that extends generally longitudinally, one of said sections carried by the other, (c) and indicator means operatively connected with said part for indicating the status of displacement of the gaging part relative to a surface to be gaged.

As will be seen, the longitudinally movable section is typically carried by the laterally movable section, and both are carried by a rotor for bodily rotation into different angular positions at which axial and radial gaging measurements may be taken; the sections are typically spring urged so that the probe or gaging part may be easily retracted after each measurement; and the laterally movable section may have adjustable lateral connection to the rotor adapting the sections to adjustable lateral positioning relative to the rotor axis for gaging pipes and pipe threads of different diameters, and for both external and internal threads.

Further, the indicator means may include longitudinal or axial indicator means to indicate the status of longitudinal displacement of the probe relative to a surface to be gaged; the longitudinal indicator means may include ADVANCE and ARRIVED indicators, such as sensor responsive different colored lights, respectively indicating the need for further longitudinal advancement of the probe and arrival of the probe, relative to a surface to be gaged with predetermined probe pressure on that surface; lateral indicator means having the same characteristics may be provided, so that reading of probe axial and radial positions may be effected after predetermined probe engagement with axial and radial surfaces, and the probe may be mounted on structure adapted to deflect and activate sensor means in response to probe engagement with surfaces to be gaged, thereby to sense desired pressural engagement of the probe with such surfaces to enhance gaging accuracy.

In addition, the gaging apparatus need not be clamped to the workpiece or pipe, but provision is made for achieving close alignment of the gage axis with the pipe axis, and the instrumentation including a computer corrects for any misalignment of such axes; and further accuracy is typically achieved by counterweighting the laterally or radially movable section that carries the probe so that manual control of probe movement may be accurately achieved or effected.

It is another object of the invention to provide means for directing movement of a gaging part or probe in a rotary direction to a series of angular positions, in each of which probe movement to a series of axial and radial positions is further directed. Such means may include "COARSE" indicator means such as templates or programming for directing movement of the probe axially to the vicinity of a surface to be gaged; and indicators such as lights to indicate "FINE" movement of the probe into engagement with the surface or surfaces to be gaged, and with proper pressure against such surface or surfaces, prior to reading the position or positions of such surfaces as by encoding and data transmission to a computer or data storage device.

These and other objects and advantages of the invention, as well as the details of an illustrative embodiment, will be more fully understood from the following description and drawings, in which:

DRAWING DESCRIPTION

FIG. 4 is an elevation taken in section on lines 4—4 of FIG. 3;

FIG. 4a is an enlarged view showing a gaging tip received adjacent thread flank and root surfaces;

FIG. 5 is an enlarged fragmentary section taken on lines 5—5 of FIG. 1;

FIG. 6 is an enlarged fragmentary section taken on lines 6—6 of FIG. 2;

FIG. 7 is a fragmentary section taken on lines 7—7 of FIG. 6;

FIG. 8 is an enlarged fragmentary section taken on lines 8—8 of FIG. 3;

FIG. 14 is an end elevation taken on lines 14—14 of FIG. 13;

FIG. 15 is a fragmentary section taken on lines 15—15 of FIG. 12 and showing control template means;

FIG. 16 is a plan view showing a movable template employed in FIG. 15;

FIG. 17 is an enlarged view on lines 17—17 of FIG. 15;

FIG. 18 is a fragmentary bottom plan view on lines 18—18 of FIG. 17;

FIG. 19 is a plan view taken in section on lines 19—19 of FIG. 12;

FIG. 20 is an elevation taken in section on lines 20—20 of FIG. 19;

FIG. 21 is an elevation showing means to bias carriage sections to a neutral position;

FIG. 22 is a schematic, partially cut-away, three dimensional view of a box thread, showing multiple gaging locations;

FIG. 23 is a geometric diagram;

FIGS. 25-27 are circuit diagrams;

DETAILED DESCRIPTION

Figure 1:
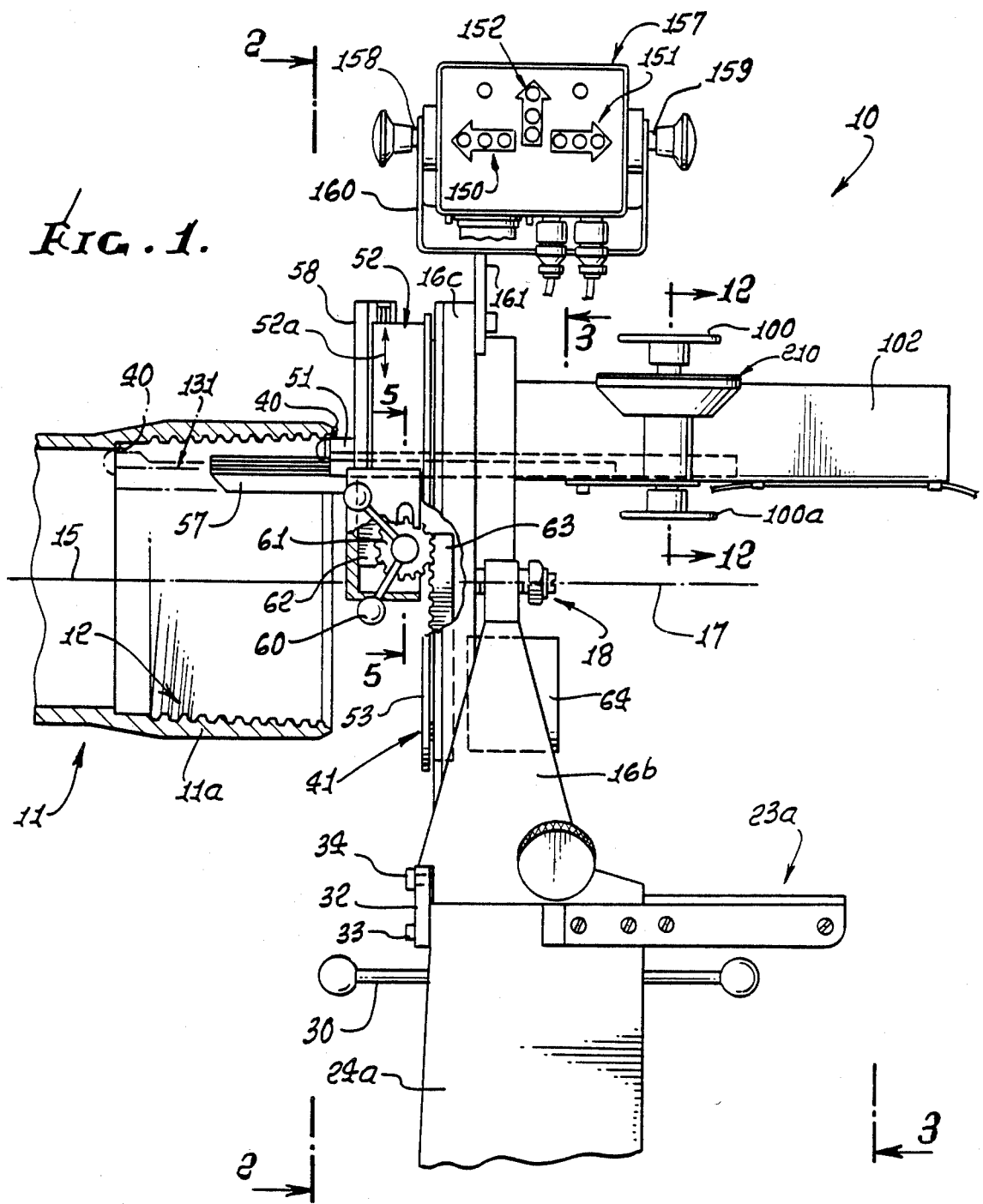
FIG. 1 is a side elevation showing gaging apparatus incorporating the invention.
Figure 24:
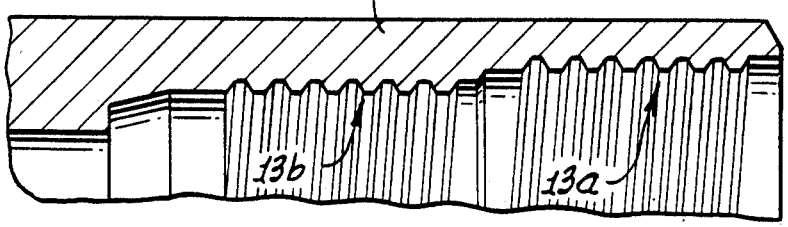
FIG. 24 is a fragmentary elevation showing a two-step thread.

In the drawings, the gaging tool or instrument is indicated at 10, and is adapted to gage the thread or shoulder of a workpiece. While various workpieces are contemplated, the example shown comprises a pipe 11, the box end 11a of which has an internal thread 12. The latter may have various forms, and is shown as a single-step internal thread. A two-step thread is seen at 13a and 13b in FIG. 24, the pipe box end being indicated at 13. The thread may also take the form as shown in FIGS. 4a and 22, and as described in U.S. Pat. No. Re. 30,647 to Blose, the tool 10 having particularly advantageous utility for gaging such a thread form. In FIG. 4a, the thread 14 is characterized as having semi-dovetail or undercut flanks 14a, and 14b which face one another. In FIG. 1 the pipe axis appears at 15.

SUPPORT STRUCTURE

Figure 3:
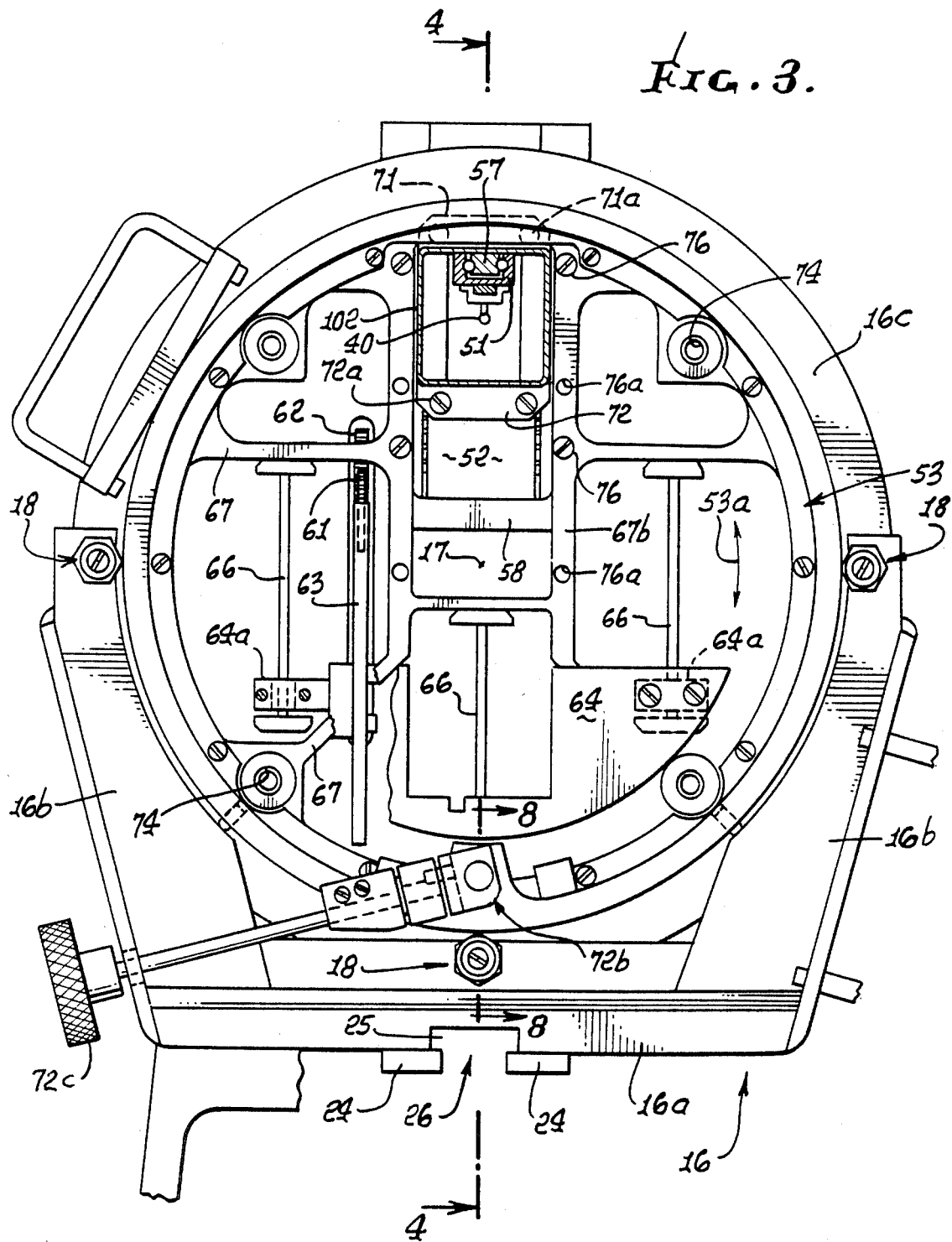
FIG. 3 is an elevation taken in section on lines 3—3 of FIG. 1.

The tool 10 includes a yoke-shaped frame 16 having horizontal frame section 16 a and generally upright arms 16b, as is clear from FIG. 3. Carried by the latter is an annular frame section 16c which is upright and has a horizontal central axis 17 which is generally parallel to pipe axis 15. Section 16c may be fastened to the arm 16b as by threaded fastener means 18 as seen in FIGS. 4 and 8, the fastener 18 include an outer threaded member 18a thread connected to the frame 16 at 19; a tubular sleeve 18b received in a bore 18c in member 18a; and interior member 18d thread connected at 18e to the annular frame section 16c. When member 18d is tightened, its head 18e clamps head 18f of sleeve 18b against head 18g of member 18a, and it also draws the face 20 of annular frame section 16c against the end 18h of fastener member 18a, whereby fastener means 18 is clamped to and adjustably mounts annular section 16c. Since there are three such fastener means, they may be individually adjusted to effect alignment of the axis of section 16c into close or exact parallel relation with a pipe axis 15 presented as in FIG. 1.

Figure 2:
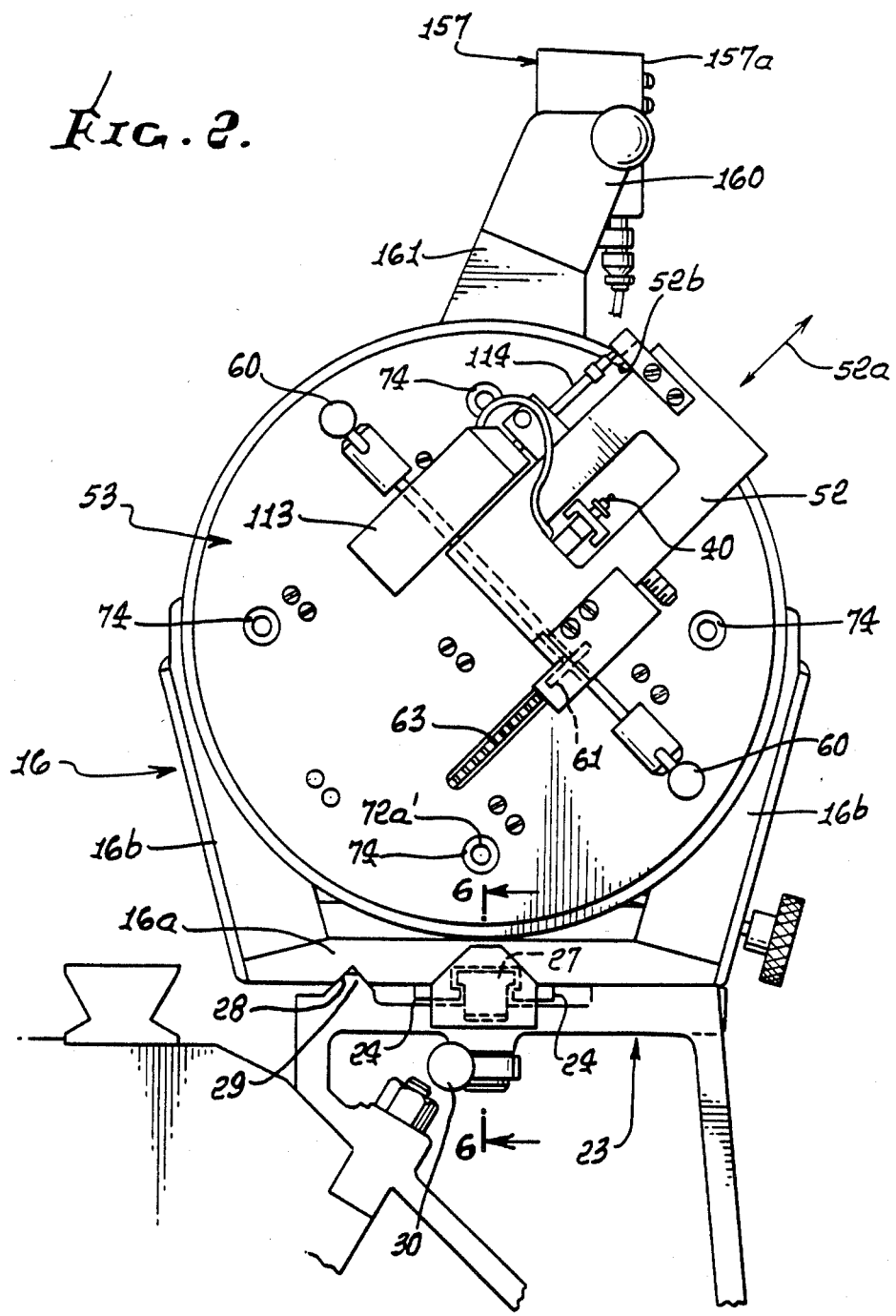
FIG. 2 is an end elevation taken on lines 2—2 of FIG. 1.

The frame 16 is in turn adapted to be supported on the bed 23 of mounting apparatus 23a which may for example comprise a lathe. For this purpose, and as seen in FIGS. 1-3, the frame section 16a may have an elongated base to carry elongated bars 24 at its underside, and adjacent slot 25, thereby to form an elongated T-slot 26 for receiving a T-bar 27 on the bed 23, and along which the frame 16 is slidable, longitudinally. Note also the inverted V-slot 28 in the frame section 16a adapted to receive an inverted V-cross section, longitudinal guide rail 29 on bed 23. Rail 29 is parallel to bar 27, is laterally offset therefrom, and prevents lateral movement of frame 16. Tightening of handle 30 champs frame 16 to bed 23.

FIGS. 1 and 6 show the provision of a stop in the form of a bar 32 attached at 33 to the apparatus bed 23, and projecting upwardly therefrom. It carries an adjustable stop pin 34 engageable with the end face 35 of slidable frame section 16a, for locating purposes. Note in FIGS. 6 and 7 the provision of a holder 37 and 38 for T-bar 27. T-bar 27 is supported at a clearance to the frame 16a by spring 39 unless clamping force is applied by rotating clamp screw 37 by means of handle 30.

GAGING PROBE

A gaging part or probe 40 is carried by carriage structure 41 to be described, the latter in turn being carried by the support structure 16 referred to above. In particular, the gaging part is carried for axial (longitudinal), radial (lateral) and rotatable movement, as for example in the space 42 between successive thread flanks (see FIG. 4a), so as to be engageable with axially opposite thread flanks as at 14a and 14b. Part or probe 40 may have a full or partial ball surface. Such a partial ball surface is shown at 40a extending annularly about radial axis 43. The probe also has a second annularly about radial axis 43. The probe also has a second surface 40b which is radially outwardly dome shaped, and centrally intersection by axis 43. Surface 40a is outwardly convex in planes which contain axis 43, to be adapted to have point contact with the thread flanks; therefore, the distance between flanks 14a and 14b may be accurately determined, that distance for example varying along the thread length as in the above referenced Blose thread. Surface 40b is convex in the radially outward direction of axis 43, to be adapted to have point contact with the pipe surface 14c (thread root) between the flanks of the thread, for accurate root-depth gaging purposes. The thread crests 14d may be similarly engaged, for gaging purposes. Part 40 is mounted on a radially outwardly projecting pedestal 45 which is in turn supported by the carriage structure. The curvature of convex surface 40a is substantially less than that of surface 40b, in axial radial planes.

CARRIAGE STRUCTURE

Figure 10:
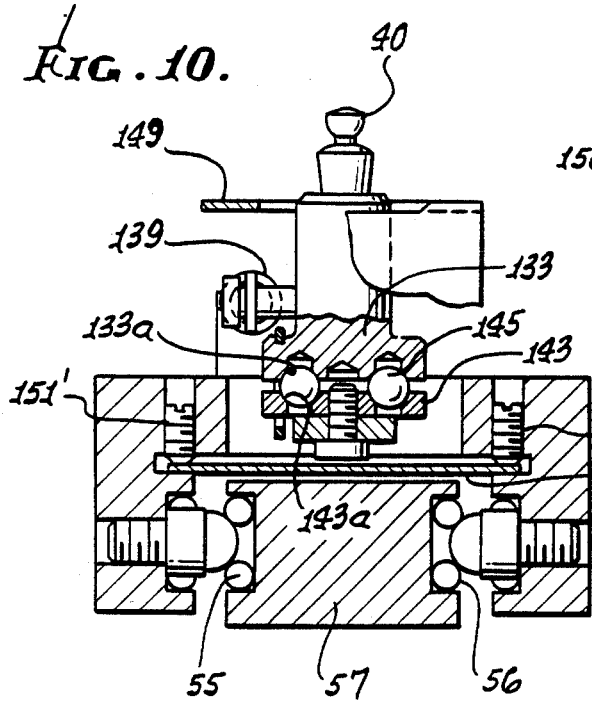
FIG. 10 is a vertical section on lines 10—10 of FIG. 9.

The carriage structure, indicated generally at 41, includes a first section (as for example section 51) movable longitudinally in the direction of arrows 51a, a second section (as for example at 52) movable laterally in the direction of arrows 52a; and a rotor, as at 53, for rotating these sections and the probe 40 about an axis extending generally longitudinally and in the direction of arrows 53a. That axis, indicated at 17 is most desirably brought into conjunction with the pipe axis 15, but need not be precisely so, inasmuch as the invention enables accurate gaging to be carried out even in the event of some axial misalignment. FIG. 4 shows the two axes 15 and 17 in exact alignment. More specifically and as seen in FIG. 10, the illustrated first section 51 is mounted via bearings 55 and 56 on a slide 57 which extends longitudinally. That slide is in turn carried by the laterally or radially movable section 52 (see FIG. 3) movable via appropriate bearings on a slide 58 (see FIG. 1) which extends radially. Slide 58 is in turn carried by the rotor 53.

FIGS. 1 and 2 show manually controllable means to displace the second section 52 radially so as to bring the probe 40 into selected radial position for gaging. Such means includes a crank handle 60 attached to a spur gear 61 engaging rack 62 on the radially movable section 52 and rack 63 integral with a counterweight 64. As the gear 61 is turned by the handle 60, the section 52 moves in one radial direction, relative to axis 17, and the counterweight 64 moves in the opposite radial direction, whereby accurate positioning of the probe 40 may be carried out relative to thread surfaces to be gaged, without being substantially affected by gravitational forces. The counterweight 64 carries bearings 64a, slidable along guide rods 66 attached to the rotor framework 67, as seen in FIG. 3. That framework is integral with the rotor 53 having the form of a ring. Bearing 68 mount the ring 53 to the annular frame section 16c, as seen in FIGS. 4 and 8, to allow controlled rotation of the rotor, for positioning the probe azimuthally (as for example at selected angular position about axis 17 for obtaining gaging data at each such position, as will be referred to).

A slip clutch device prevents too much radial force exertion on the probe during probe engagement of a surface (such as pipe thread root surface 14c in FIG. 4a), so as to avoid damage to the probe. FIG. 5 illustrates one such clutch through which angular motion is transmitted from the shaft 60a of the handle 60 to the spur gear 61. Gear 61 is rotatable about the shaft 60a, but normally rotates therewith due to frictional surface engagement at 80 with a flange 81 integral with the shaft. A Belleville spring 82 (confined by flange 84) urges the gear toward flange 81 to develop sufficient surface friction so as to transmit the motion; however, after the probe 40 engages the work surface with predetermined force, the resistance to further turning of the gear develops reaction torque which overcomes the frictional torque acting to rotate the gear, and the clutch slips, on the gear face.

Also provided is connection means providing adjustable lateral connection of the sections to the rotor, adapting the sections to adjustable lateral positioning relative to the rotor axis 17. For example, the second section 51 may be rotated 180° so that the probe 40 instead of being located to project radially outwardly inside a pipe box, as in FIG. 1, may be alternatively positioned to project radially inwardly, outside the externally threaded pin end 70 of a pipe as in FIG. 4. For this purpose, and referring to FIG. 3, flanges 71 and 72 are provided at radially opposite sides of and integral with the square cross-section housing 102, to receive removable fasteners 71a and 72a for attaching the housing 102 to the second section 52. Since the fasteners 71a have the same separation and positioning as the fastener 72a, they may be removed, the housing rotated 180° to reverse the positions of the flanges 71 and 72, and the fasteners re-inserted and tightened to radially invert the positions of the probe 40, as well as section 51 which is carried by 57 and thereby mounted to 102.

In addition, provision is made for adjustable lateral positioning of the movable sections 51 and 52 closer to or further from axis 17, to enable gaging of pipe of different diameters (large and small pipe, for example). In FIG. 3, the slide 58 is shown as attached via fasteners 76 to the framework 67b. Those fasteners may be removed, the slide 58 displaced radially to be connected by the fasteners to openings 76a in the frame.

Also shown is means for locking the rotor 53 at selected angular gaging positions about axis 17, as for example at 90° intervals. Such means is shown in FIGS. 2, 3, 4 and 8 to include tongue and groove mechanism for interconnecting the rotor and frame, and holder means to hold the interlocking mechanism in selected position. See for example the plunger (tongue) 72' having a tapered head 72a' and retract mechanism 72b, carried by the tubular part 73 in frame section 16c and operated by retract knob 72c. FIG. 8 shows the plunger in advanced (interlock) position, with tapered head received in one of several tapered sockets 74 carried by the rotor, at angular spaced intervals about axis 17. FIG. 4 shows the retracted position of the head 72a', during rotation of the rotor to selected position. A spring 75 forces the plunger 72a,b into the socket 74 to lock the rotor 53 in indexed (set) position. Accordingly, gaging may be accurately carried out with the rotor firmly locked in position and against rotation.

FIG. 21 shows the provision of means to yieldably and resiliently bias the carriage sections 51 and 52 in a radial direction indicated by arrows 90 toward a neutral position, in order that the probe 40 will be urged away from the threads after a gaging operation, and after handle 60 is released. To this end, the radially movable section 52 may carry a plate 92 which can be an integral part of 102 having cam surfaces 93 and 94 defining an angle $\alpha$ therebetween which is less than 180°, the surfaces angled to define a dwell zone 95 near their intersection. Surfaces 93 and 94 have radially directed components, as shown. A cam roller 96 is urged by spring 97 toward the plate and toward one or the other of the surfaces, the roller and spring carried by slide 58. Accordingly, radially directed force is developed and exerted on the plate, and the plate and carriage sections 51 and 52 are displaced until the cam roller arrives at dwell zone 95.

FIGS. 1, 4, 12–14, 19 and 20 illustrate the provision of a manual control mechanism, including handle 100, for advancing and retracting the carriage section 51 in the axial direction indicated by arrows 51a. That mechanism includes fixed elongated support structure 102 attached to fixed slide 57, and upper and lower mounting plates 103 and and 104 attached to hollow support structure 102. See FIG. 12 in this regard. The hand 100 is attached to and carried by a vertical shaft 105 journaled for rotation by bearings 106 and 106a carried by plates 103 and 104. A spur gear 107 is attached to shaft 105 and has toothed engagement at 108 with an axially elongated rack 109 carried by the axially movable carriage section 51. FIG. 20 shows tension springs 110 anchored to fixed structure 102a and also attached to bracket 51b at 110a. Bracket 51b moves with section 51, which is slidably guided by slide 57. Accordingly, as handle 100 is rotated in one direction, the section 51 and probe 40 are advanced longitudinally and relatively toward the pipe 11, such advancement yieldably resisted by springs 110, when handle 100 is released. Springs 110 return the section 51 and probe rightwardly, in FIGS. 19 and 20.

A second and like handle 100 is also attached to shaft 105, for use when the probe is inverted, as between FIGS. 1 and 4 positions, as described above.

ENCODING

Also provided is means operatively connected to the two carriage sections 51 and 52 to produce outputs indicative of the extent of such axial (longitudinal) and radial (lateral) movements of the two sections. In this regard, axial movement of section 51 is independent of radial movement of section 52, and vice versa, for maximum gaging accuracy and versatility, as respects the illustrated pipe threads. Such means may advantageously include axial encoder 112 (see FIG. 12) and radial encoder 113 (see FIG. 2). Encoder 113 is shown as operatively connected with radially movable section 52 via a plunger 114 spring urged adjacent a shoulder 52b and movable in the encoder 113 which is carried by slide 58. Similarly, as the probe 40 is moved axially relative to the frame, the encoder 112 encodes such movement. Each encoder may for example include a linear differential transformer with linear voltage output.

FIG. 25 shows the two encoders with outputs at 112a and 113a transmitted to circuitry 116. The latter includes a computer having comparator circuits 117. In this regard, it is clear that each encoder accurately senses the different positions of the thread surfaces that the probe or part 40 engages. Referring to FIG. 14, trigger handle 120 is shown as pivoted at 121 to slide housing structure 102, and connected via link 122 to a switch 123, for example. That switch is shown in FIG. 25 as connected via lead 124, in enabling relation with data processing circuitry 116. Circuitry includes indicator circuitry 309 (see FIG. 27), data collection circuitry 310 (see FIG. 26), and data manipulation circuitry 311 (see FIG. 26a).

Also shown in FIG. 25 is the provision of a rotary encoder 126 for sensing the quadrant position of rotor 53. The output of that encoder is also transmitted at 127, to the circuitry 116, so that, as will be seen, indication can be made to the user that a completed group of measurements has been made at a selected quadrant, and that the rotor should be rotated to the next angular position in which another group of measurements is to be made. See for example visual indicator 127a in FIG. 25.

Figure 9:
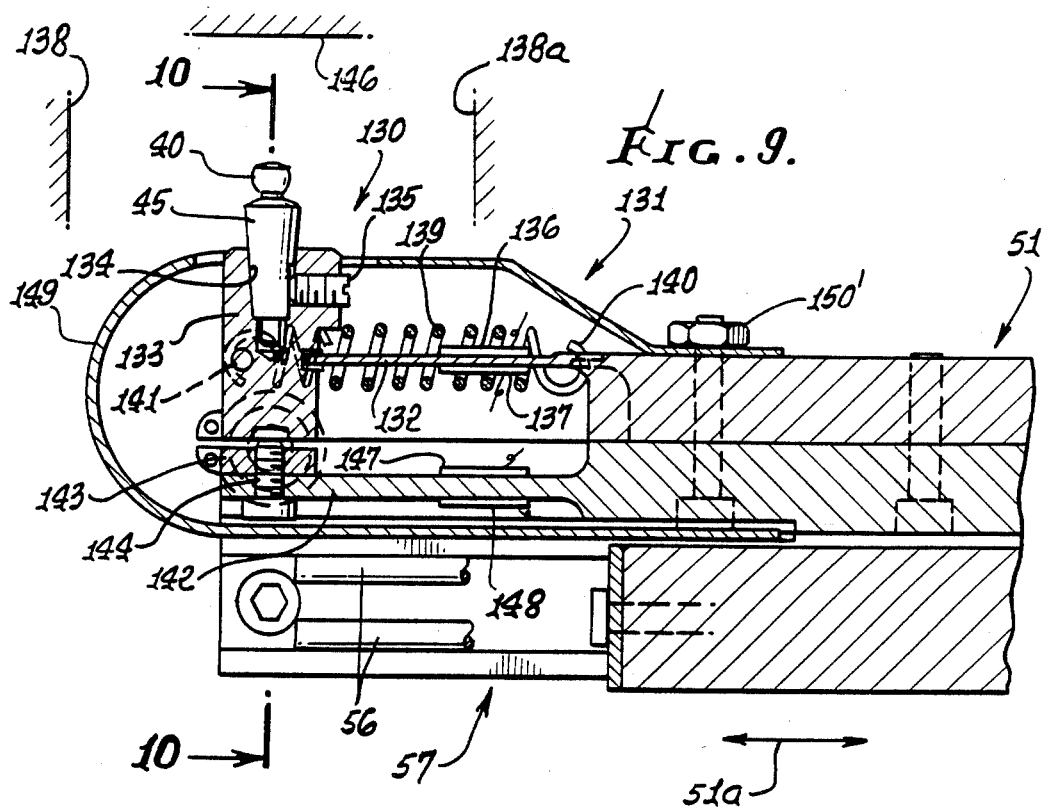
FIG. 9 is a vertical section taken through head structure associated with a gaging tip.

As seen in FIGS. 9 and 10, the probe or part 40 is carried by a mounting means 130 associated with a head 131 located at the forward end of the axially movable carriage section 51, that mounting means adapted to deflect upon engagement of the probe with a surface to be gaged. The mounting means includes a horizontal and axially extending beam 132 projecting forwardly from the section 51 with which it is integral, and a vertical carrier 133 connected to the end of the beam 132. The probe downwardly tapered shank 45 is seated in a downwardly tapered recess 134 in carrier 133, and retained by set screw 135. Two bonded wire strain gage sensors 136 and 137 are bonded to upper and lower sides of the beam 132 to sense compression deflection of the beam induced by axial engagement of the probe with a surface, as at 138; accordingly, sensors 136 and 137 sense longitudinal deflection of probe 40 upon its engagement with a surface, such as surface 138 or 138a. Spiral tension springs 139 extend parallel to beam 132 and are connected at 140 to section 51, and at 141 to carrier 133, for pre-loading the beam in compression; hence the engaging of either thread flank 14a, 14b will cause change in compression since no tension can be applied to the beam.

Lateral deflection (i.e. in a generally radial direction, as respects axis 17) of the probe is also sensed, by the following described means. Beam 142 is integral with the forward end of section 51, and projects parallel to beam 132. Its forward end carries a bearing plate 143, held in position by fasteners 144. Two bearing balls 145 are held, with pressure exerted by a retaining ring, in position between conforming bearing surfaces 143a on plate 143, and bearing surfaces 133a on the bottom surface of carrier 133. When probe 40 radially and pressurally engages a surface as at 146, it deflects downwardly, to bend beam 142 downwardly. This causes bending of the bonded wire strain gages 147 and 148 on upper and lower sides of beam 142, to produce an electrical output proportional to the radial deflection of the probe. A protection shield 149 extends about the beams and carrier, and is attached to the section 51 at 150' and 151'.

INDICATOR MEANS

The gages 136 and 137, and 147 and 148 may be considered as components of indicator means operatively connected with the probe or part 40 for indicating the status of displacement of the part 40 relative to a surface to be gaged. More particularly, the indicator means includes longitudinal indicator means for indicating the status of longitudinal displacement of probe 40 relative to a surface (say surface 138 or any other axially facing thread surface) and lateral indicator means for indicating the status of lateral displacement of the probe relative to a surface to be gaged (such as surface 146 or any other radially facing thread surface).

Figure 11:
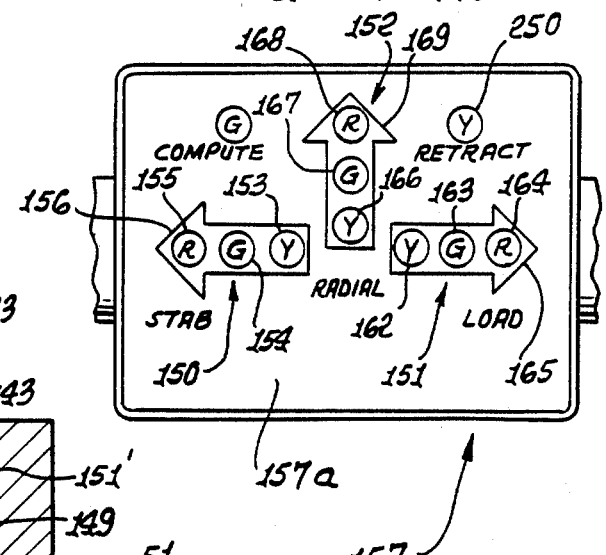
FIG. 11 is an enlarged frontal elevation showing details of an indicator panel.
Figure 12:
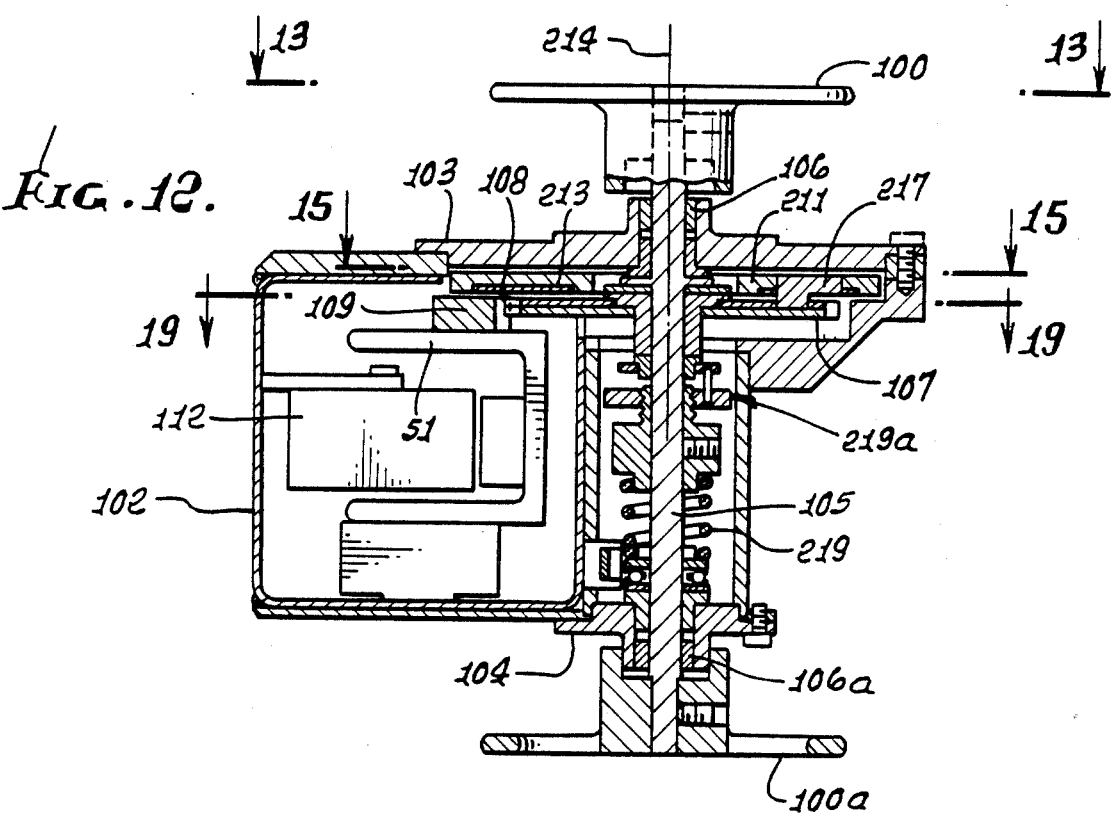
FIG. 12 is an enlarged section taken on lines 12—12 of FIG. 1.

In the embodiment shown in FIGS. 1, 2 and 11, the longitudinal indicator means is exemplified by different colored lights in "STAB" group 150 and "LOAD" group 151, and the lateral indicator means is exemplified by different colored lights in "RADIAL" group 152. Group 150 includes a yellow Ⓨ light 153, a green Ⓖ light 154 and a red Ⓡ light 155, all within an arrow 156 pointing in one axial direction (STAB). Likewise, group 151 includes a yellow Ⓨ light 162, a green Ⓖ light 163 and a red Ⓡ light 164, all within arrow 165 pointing in the axially opposite (LOAD) direction; and group 152 includes a yellow Ⓨ light 166, a green Ⓖ light 167, and a red Ⓡ light 168, all within a arrow 169 pointing in a radial direction. These elements are located on face 157a of a control box or housing 157 and they face the operator. Box 157 is pivotally mounted at 158 and 159 on a bail 160 attached via bracket 161 to ring 16c.

Generally speaking, the lights in each group indicate the ADVANCE or ARRIVED status of the probe, with respect to a surface to be gaged, in the indicating arrow direction. Thus, if surface 138 is to be gaged, and the probe 40 is spaced rightwardly therefrom, the yellow light 153 is "ON" to prompt the operator to move the probe axially to engage surface 138. At that time, if the red light 155 comes ON, it thereby indicates that too much pressure is being exerted by the probe 40 against that surface, as sensed by gages 136 and 137 described above. Therefore, the operator must relieve that pressure by manipulating handle 100 to retract the probe slightly until green light 154 comes ON, with the probe still in engagement with surface 138. Assuming the probe is then properly positioned radially, as will be further explained, the trigger 120 is then operated to actuate switch 123 to permit the longitudinal (axial) distance value then measured by the longitudinal encoder to be transmitted by circuitry 116 for recordation (printing, storage in a register, etc.). A recorder is indicated at 118 in FIG. 25.

Figure 27:
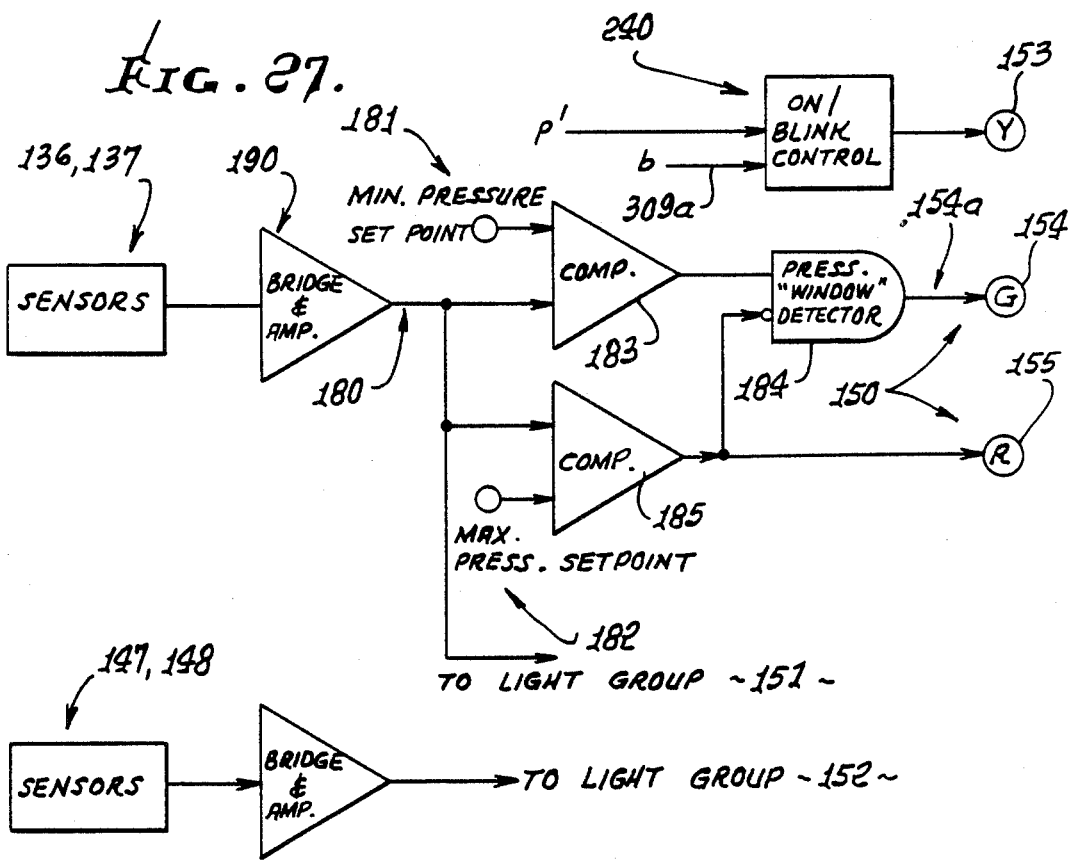

Merely as illustrative, note the circuitry shown in FIG. 27. The minimum pressure setpoint 181 and the maximum pressure setpoint 182 are defined by the proportional voltage outputs of the sensors 136 and 137 corresponding to the beam deflection caused by minimum and maximum desirable pressure, respectively. If the probe 40 is spaced from surface 138, the voltage at 180 is lower than the minimum pressure set point voltage 181, therefore there is no output from comparator 183 to turn ON the green light 154, nor the red light 155. If the probe engages surface 138 with correct pressure, the voltage at 180 will be greater than setpoint 181 but less than setpoint 182. Hence the comparator 183 output is 'true', but the comparator 185 output is 'false', causing the green light to turn ON while keeping the red light OFF. Likewise, if probe 40 engages surface 138 with too much pressure, sensors 136 and 137 are further strained, changing the balance of the bridge amplifier 190, causing the voltage at 180 to exceed the maximum pressure setpoint 182. Both comparator 183 and 185 outputs are 'true', hence the red light 155 turns ON while forcing the green light 154 OFF.

When the green light 154 is ON, switch 123 (see FIGS. 25 and 26) is operated to signal the sequencer 203 in FIG. 26 to pass the encoder data at 201a to the circuitry 116, for recordation in internal memory storage 207.

In similar manner, the light group 151 is controlled by the sensors 136 and 137, for controlling probe advancement toward and in engagement with an oppositely axially facing surface, indicated at 138a in FIG. 9. Light group 152 is controlled by radial sensors 147 and 148 in similar manner, as shown in FIG. 27, and as respects probe engagement with radially facing surface 146, shown in FIG. 9. Typically, the probe will engaged with both axial and radial surfaces, as at 14a and 14c in FIG. 4a, to the extent that both green lights 154 and 167 are ON (or both green lights 163 and 167 are ON) prior to operation of switch 123. This enables the operator to know that the probe is at the correct radial position relative to flank 14a and 14b to be gaged, at the time of gaging (switch 123 actuation).

Referring now to FIG. 22, a pipe (box) thread to be gaged is shown at 414, and corresponds to thread 14 in FIG. 4a. The invention enables rapid gaging of a sequence of thread surfaces indicated by the encircled numerals ①- ⑲ at four different angular positions about the pipe axis 215. In this regard, note in the schematic view of FIG. 23 that the pipe axis 415 and the gage apparatus axis or centerline 416 may not be coincident but rather may extend at a relative angle γ; however, compensation or adjustment for this angularity or non-alignment of axes is or may be accomplished as in the computer apparatus indicated at 116 in FIG. 25.

It will first be noted in FIG. 22 that measurements are taken with the rotor 53 at a first angular position (ZERO position) about the gaging axis. In that position, the above is manipulated to engage the pipe end at ①; then to move axially and radially and engage the thread at ②; and finally to move axially and radially to engage the pipe sealing surface at ③.

The probe is then axially retracted and the rotor 53 rotated 90° about axis 416 to a second angular position (90° position). In the latter the probe is manipulated to engage the pipe end at ④; then the probe is successively moved to engage the pipe thread at ⑤ and pipe at ⑥, for gaging at each such location.

The probe is then axially retracted and the rotor 53 rotated 90° to a third angular position (180° position). In the latter the probe is manipulated axially and radially to engage the pipe end at ⑦, and then the thread at location ⑧ and pipe at ⑨, for gaging at each location.

Finally, the probe is retracted and the rotor rotated 90° to a fourth angular position (270° position). In the latter, the probe is manipulated axially and radially to engage the pipe end at ⑩, and then to engage the thread at ⑪- ⑯, the tapered sealing surface at ⑰ and ⑱, and finally the sealing shoulder at ⑲. The four angular positions as described may correspond to the positions of rotor sockets 74 described above.

Referring now to circuit block diagram shown in FIG. 26, means is provided to compare the 'actual' position data, generated upon probe surface sensing at each probe position ①, ..., ⑲, with 'desired' position data corresponding to that position. In FIG. 26, the sensed values produced by encoders 112, 113, 126 and pressure sensor signals from indicator circuit 309 for position ① are shown supplied to the comparator 201, to which 'desired' corresponding values are also supplied at $X'_i$, $Y'_i$, $\phi'_i$ and $P'_i$. The latter are supplied from memory 202 by the sequence control 203 selecting switches 204 and 205 to close in the position ①. The sequence control 203 also selects the appropriate yellow light to turn ON. The triggering of switch 123 connected to the comparator enables the comparator to perform the function of comparing of the 'desired' and 'actual' data.

Figure 26A:
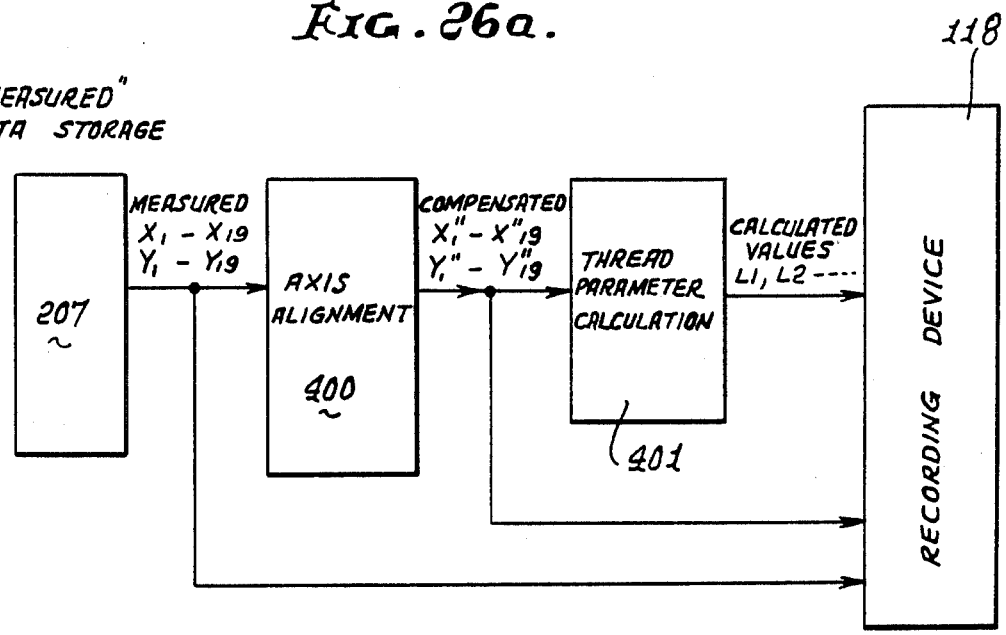

If the comparison is favorable, the comparator closes (at 206a) the enter switch 206 to enter the 'actual' data X, Y into the X1, Y1 slot of the 'measured' data storage 207, and then advances the sequencer to the subsequent position, in this case position ②. If the comparison is unfavorable, the switch 206 will stay open while the sequencer outputs or turns on "blink" control signal 309a to blink the yellow lights. Until the comparison is favorable, the sequencer will not advance to next position. As shown in FIG. 26a, after all 19 of the position data X1–X19 and Y1–Y19 are collected in storage 207, they are corrected at 400 by axis alignment software programming in the circuitry 116 to compensate for any misalignment of axes 215, 216 shown in FIG. 23. The compensated position data X"1–X"19 and Y"1–Y"19 thus computed provide the basis or means to determine at 401 the 'measured' thread parameters L1, L2, L20 . . . etc. Thereafter the result summary is transmitted serially to a recorder or printer 118. If the error values are not above unacceptable limits, the thread is, accordingly, considered as acceptable.

Figure 13:
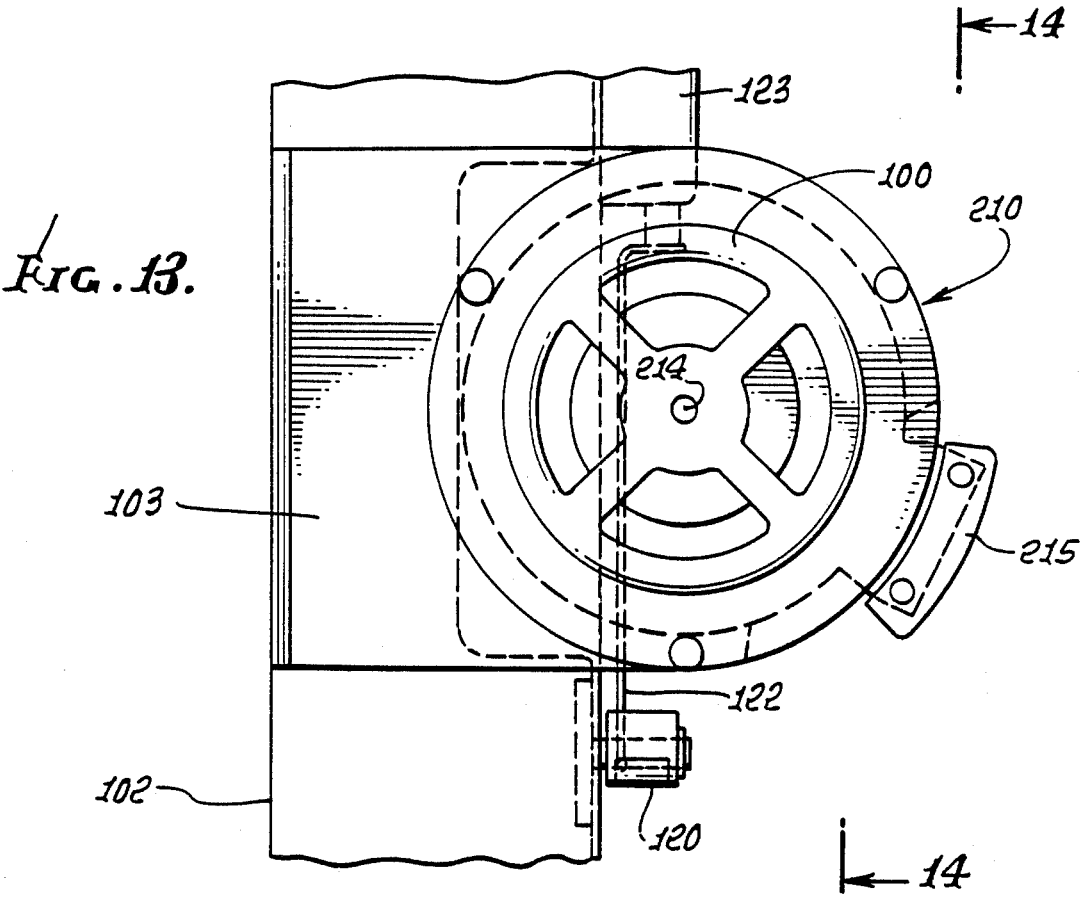
FIG. 13 is a plan view on lines 13—13 of FIG. 12.

After data for position ③ is stored, the sequencer 203 turns on RETRACT yellow light 250 as shown in FIG. 11 to request the probe 40 to be retracted in axial direction to achieve initial home detent position. When the probe 40 is retracted, the sequencer 203 turns ON yellow lights 153, 162, 166 and also the blink control 309, causing all yellow lights 153, 162 and 166 to flash which indicates to the operator that the rotor 53 should be turned 90° to 90° position, for gaging at location ④, ⑤ and ⑥. After being rotated, the sequencer continues with data collection for position ④ and on. Similarly flashing yellow lights are provided after positions ⑥, ⑨ and ⑲ to indicate need to rotate the rotor. FIGS. 12-17 illustrate the provision of means including "fixed" and movable templates usable to provide "coarse" axial positioning of the probe relative to thread surfaces to be gaged. In this regard, a template housing 210 shown in FIGS. 13 and 14 is associated with the axial probe position control including handles 100 and 100a. "Fixed" template 211 is typically non-rotatable, and fasteners 212 hold that template and rim portion of the housing together. A generally annular, movable template 213 is carried by template 211 for limited rotation about axis 214 defined by shaft 105. A handle 215 on template 213 is manually adjustable to rotate that template during the gaging sequence, and relative to template 211. Template 213 contain slots as at 213a-213e, spaced above axis 214; and template 211 also contains slots as at 211a-211f, adjustably registrable with slots 213a-213e, as template 213 is rotated, and in relation to a detent projection 217. The latter is carried by gear 107 and is subject to controllable axial movement into and out of the slots as handle 100 is depressed, or elevated by spring 129, via coupling 219a.

OPERATION

A typical initial condition includes the gaging platform or carrier 51 at zero position (see FIG. 22) with yellow (Y) stab and yellow (Y) radial lights (lights 153 and 166) "ON". The probe 40 is effectively stored in home detent position. The movable template is forcibly rotated clockwise against frictional resistance imposed by template 211 to enage a shoulder 220 on housing 210.

To now advance the probe to ① position, handle 100 is rotated counterclockwise and handle 60 manipulated, until probe 40 engages the leading edge of the workpiece at ①. During such rotation of handle 100, it is held in depressed condition as detent 217 rides against the underside of template 213. Handle 100 will "pop up" as detent 217 comes into registration with predetermined slots in templates 213 and 211, due to upward spring urging of gear 107 and the detent 217 by spring 219. The green (G) lights 154 and 167 will come ON when proper handle torques are applied. The manually operated "READ" trigger 120 is then operated, to store $X_1$ and $Y_1$ data in the memory 207 of the computer 116. The G lights 154 and 163 go off when the probe is moved away from the workpiece. Thereafter, the yellow lights 153 and 162 come ON with yellow light 163 off indicating that the probe 40 is to be moved to the next position ②. In the above, if either red light (R) 155 or 168 comes ON, prior to operation of the trigger, it indicates too much handle torque is being applied, and that such torque should be reduced to achieve green light ON condition, as explained above.

To now proceed to ② position, both handles 100 and 60 are manipulated so that the probe is moved away from the workpiece shoulder just previously gaged. In this regard, it will again be noted that the carriers are spring loaded toward "neutral" position, so that release of the handles aids in effecting probe movement away from the workpiece shoulder. Handle 100 is again depressed (to release ane remove detent 217 from the template slots); and handle 100 is rotated counterclockwise until the upwardly spring urged projection 217 riding on the under-surface of movable template 213 "pops-up", i.e. enters another pair of template slots. This indicates at "coarse" axial locating of the probe in relation to the next surface to be gaged, i.e. at ②. Handles 100 and 60 are manipulated until the probe presses against the trough floor and flank of the thread from at ②. (See also FIG. 4a). The yellow (Y) lights will be matched by green (G) lights 154 and 167 when proper handle torques are applied. Trigger 120 is again actuated to operate "READ" switch 123 and data $X_2$ and $Y_2$ is entered into the computer 116, as described above.

The measurement at ③ is made in the same manner, after which a "RETRACT" yellow light comes ON, as at 250 in FIG. 11. Also, all yellow lights 152, 162 and 166 are programmed to blink. Handle 100 is depressed, and both handles 100 and 60 manipulated to retract the probe 40 in the axial direction to achieve initial home detent position, as described above, causing the "RETRACT" yellow light to go OFF.

Next, the rotor 53 is rotated 90°, at which time blinking yellow light 162 goes OFF, and yellow lights 153 and 166 remain ON. Measurement at ④, ⑤, ⑥ are then taken in the same manner as described above for ①, ② and ③; and subsequently measurements are made at ⑦- ⑲ , by manipulating the rotor to 180° and 270° position and the handles 100 and 60 as described above.

In the above, the function of the template apparatus may alternatively be carried out in the computer, as by software programming, to direct and indicate "coarse" movement of the probe 40 into the vicinity of a surface or surfaces to be gaged.

Typical measurements for a female thread on a 2⅞ inch diameter pipe, at the above describe 19 position, are shown in the following:

TABLE I

MEASUREMENTS FOR A FEMALE THREAD A 2⅞ INCH DIAMETER PIPE

| NO. | MEASURED VALUES | | COMPENSATED VALUES | |
|---|---|---|---|---|
| | X-VALUES | R-VALUES | X-VALUES | R-VALUES |
| 1 | 10.624 | 39.728 | 0.012 | 38.290 |
| 2 | 72.492 | 34.430 | 59.864 | 34.164 |
| 3 | 90.444 | 32.042 | 78.803 | 32.233 |
| 4 | 10.756 | 40.228 | 0.000 | 38.291 |
| 5 | 67.068 | 34.952 | 54.317 | 34.404 |
| 6 | 90.550 | 32.206 | 78.787 | 32.195 |
| 7 | 10.796 | 40.464 | 0.012 | 38.290 |
| 8 | 68.972 | 35.020 | 56.187 | 34.278 |
| 9 | 90.414 | 32.338 | 78.628 | 32.147 |
| 10 | 10.638 | 39.962 | 0.000 | 38.291 |
| 11 | 33.716 | 36.532 | 21.055 | 36.133 |
| 12 | 35.808 | 36.522 | 25.175 | 35.922 |
| 13 | 31.924 | 35.544 | 20.255 | 35.647 |
| 14 | 70.702 | 34.662 | 58.040 | 34.206 |
| 15 | 71.038 | 34.642 | 60.404 | 33.987 |
| 16 | 66.756 | 33.672 | 55.087 | 33.721 |
| 17 | 85.360 | 32.432 | 73.697 | 32.452 |
| 18 | 90.418 | 32.150 | 78.754 | 32.162 |
| 19 | 92.450 | 31.752 | 81.723 | 31.051 |

In the above, compensated values are typically computed after the last of the 19 measurements are made. The compensated values are those that would exist if the measurements had been made with the axis 17 of the rotor 53 precisely aligned with the axis 15 of the threads. The compensated values are then used in the determination of calculated values in the following table, wherein expected (desired) values are also set forth along with differences and tolerances in thousandths of a millimeter.

TABLE II

|  | MEASURED | EXPECTED | ① DIFF | ② DIFF | TOL |
|---|---|---|---|---|---|
| LOAD FLANK LEAD (L2) | 7.397 | 7.401 | −0.004 | −0.004 | 0.013 |
| STAB FLANK LEAD (L1) | 7.046 | 7.051 | −0.005 | −0.003 | 0.013 |
| RADIAL CHANGE PER REVOLUTION (H1) | 0.386 | 0.390 | −0.004 | −0.005 | 0.013 |
| GAUGE DISTANCE (L20) | 33.573 | 34.260 | −0.687 | −0.705 | 0.210 |
| LOAD FLANK GAUGE DIAMETER (D2) | 70.963 | 71.380 | −0.417 | −0.405 | 0.038 |
| FIRST PIPE END DIAMETER (D24) | 76.582 | 76.600 | −0.018 | −0.001 | 0.130 |
| SECOND PIPE END DIAMETER (D24) | 76.581 | 76.600 | −0.019 | −0.005 | 0.130 |
| SEAL ANOLE(DEG) (A3) | 3.280 | 3.000 | 0.280° | 0.324° | 0.250° |
| LENGTH TO SEAL GAUGE DIAMETER (L24) | 71.925 | 74.610 | −2.685 | −2.424 | 0.130 |
| FIRST SEAL GAUGE DIAMETER (D21) | 65.142 | 65.150 | −0.008 | −0.009 |  |
| SECOND SEAL GAUGE DIAMETER (D21) | 65.158 | 65.150 | 0.008 | 0.009 |  |
| SEAL DIAMETER RUN-OUT (T1R) | −0.008 | 0.000 | −0.008 | −0.009 |  |
| BOX LENGTH (L25) | 81.723 | 81.910 | −0.187 | −0.137 | 0.130 |
| FRONT STAB FLANK THREAD HEIGHT (H3) | 1.360 | 1.390 | −0.030 | −0.038 | 0.013 |
| REAR STAB FLANK THREAD HEIGHT (H3) | 1.352 | 1.390 | −0.036 | −0.041 | 0.013 |
| FRONT LOAD FLANK THREAD HEIGHT (H2) | 0.987 | 1.000 | 0.013 | 0.020 | 0.013 |
| REAR LOAD FLANK THREAD HEIGHT (H2) | 0.985 | 1.000 | 0.015 | 0.019 | 0.013 |

Figure 28:
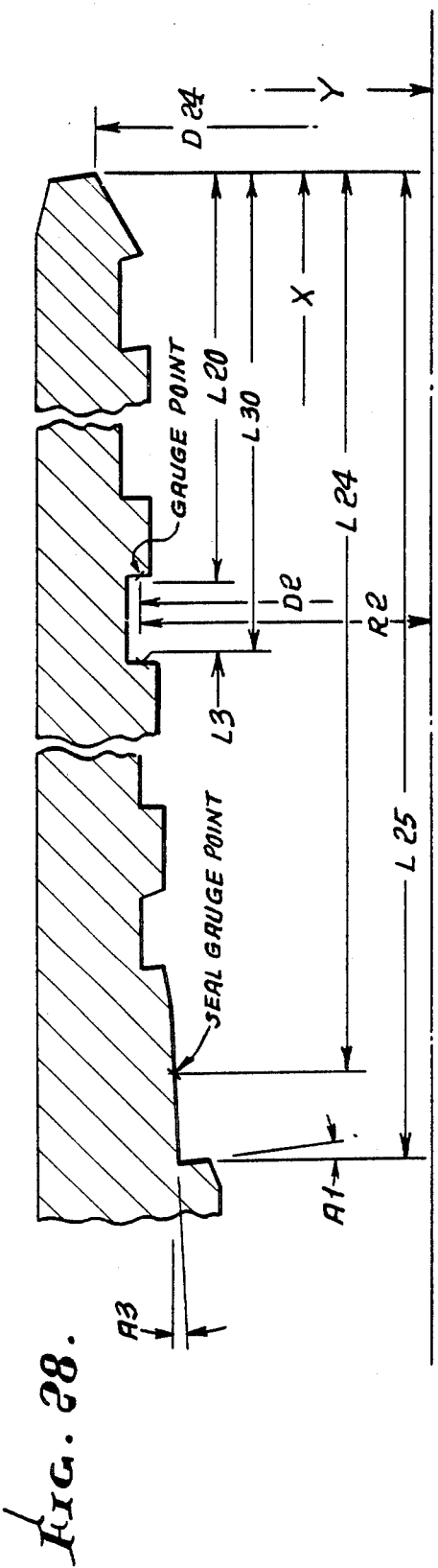
FIGS. 28 and 29 are schematic showings of pipe threads with critical dimensions labeled, to correspond to TABLE II in the specification.
Figure 29:
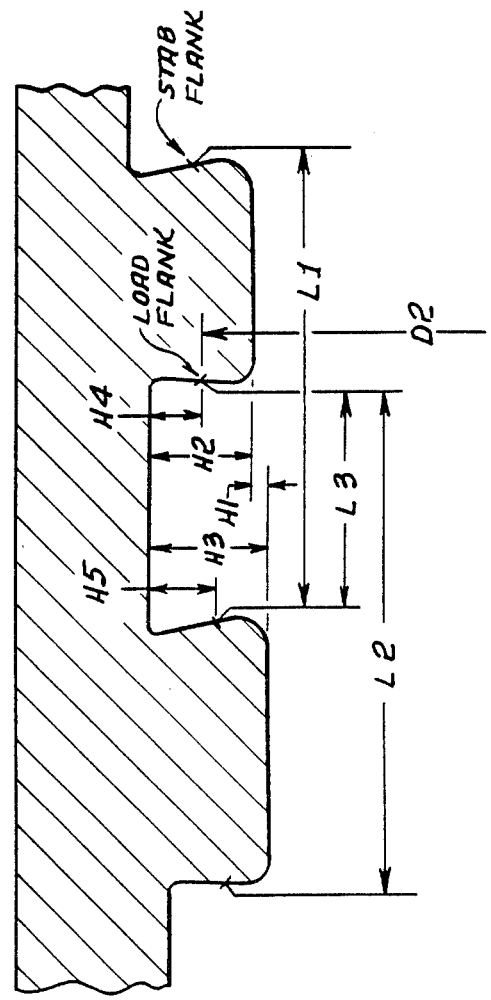

In the above table, the L2, L1 etc. designations are those as shown in drawing FIGS. 28 and 29.

We claim:

1. In the method of gaging surfaces of workpiece, and wherein a probe carried by a mounting is movable in two directions and to multiple locations to engage such surfaces, said surfaces defined by a pipe thread at multiple locations located both axially lengthwise of the pipe and radially of the pipe axis, and at different azimuths relative to the pipe axis, the steps that include
    (a) advancing the probe to a first location for engagement with one or more of such surfaces,
    (b) urging the probe pressurally against said one or more surfaces, and to an extent or extents so that the mounting deflects,
    (c) detecting the extent of said mounting deflection to determine whether or not the probe pressure exerted against said one or more surfaces is within an acceptable range,
    (d) gaging actual probe positions in said two directions while the probe is exerting said acceptable pressure against said one or more surfaces,
    (e) carrying out said (a) through (d) steps repeatedly with respect to the surface or surfaces at each of a number of said locations to be gaged and which are spaced generally axially of the pipe,
    (f) and rotating the probe about said axis and carrying out said steps (a)–(d) with respect to the surface or surfaces at each of another number of said locations to be gaged and which are spaced generally axially of the pipe.

2. The method of claim 1 wherein said surfaces are defined by a pipe thread, and said (a) step includes advancing the probe generally axially and radially, relative to the pipe.

3. The method of claim 2 wherein said (a) step includes employing a guide means to guide probe advancement axially into the predetermined vicinity of the surface or surfaces to be gaged, and thereafter carrying out said (b) step.

4. The method of claim 1 wherein said (c) step includes operating light means responsive to probe pressure exertion against said one or more surfaces, to visually indicate whether or not such pressure is within said acceptable range.

5. The method of claim 2 wherein said (c) step includes operating first light means responsive to probe pressure exertion against an axially facing surface to visually indicate whether or not such pressure is within said acceptable range, and operating second light means responsive to probe pressure against a radially facing surface to visually indicate whether or not such pressure is within an acceptable range.

6. The method of claim 1 wherein said (d) step includes producing encoded data signals indicative of said actual probe positions, and comparing said data signals with predetermined corresponding desired probe position signals, to determine deviation of actual probe positions from desired probe positions in said two directions.

7. In the method of gaging surfaces of workpiece, and wherein a probe carried by a mounting is movable in two directions and to multiple locations to engage such surfaces, said surfaces defined at multiple locations located both axially lengthwise of the workpiece and radially of its axis, and at different azimuths relative to said axis, the steps that include
    (a) advancing the probe to a first location for engagement with one or more of such surfaces,
    (b) urging the probe pressurally against said one or more surfaces, and to an extent or extents so that the mounting deflects,
    (c) detecting the extent of said mounting deflection to determine whether or not the probe pressure exerted against said one or more surfaces is within an acceptable range,
    (d) gaging actual probe positions in said two directions while the probe is exerting said acceptable pressure against said one or more surfaces,
    (e) carrying out said (a) through (d) steps repeatedly wiith respect to the surface or surfaces at each of a number of said locations to be gaged and which are spaced generally axially of the pipe,
    (f) and rotating the probe about said axis and carrying out said steps (a)–(d) with respect to the surface or surfaces at each of another number of of said locations to be gaged and which are spaced generally axially of the workpiece.

* * * * *